(12) United States Patent
Amini et al.

(10) Patent No.: US 10,798,702 B2
(45) Date of Patent: Oct. 6, 2020

(54) PERIODIC FRAMES FOR CONTROL PLANE DATA TO MANAGE MULTI-BAND WIRELESS NETWORKING SYSTEM

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 71 days.

(21) Appl. No.: 15/952,995

(22) Filed: Apr. 13, 2018

(65) Prior Publication Data

US 2018/0310301 A1 Oct. 25, 2018

Related U.S. Application Data

(60) Provisional application No. 62/488,258, filed on Apr. 21, 2017.

(51) Int. Cl.

| | | |
|---|---|---|
| H04W 40/24 | (2009.01) | |
| H04L 1/00 | (2006.01) | |
| H04W 72/04 | (2009.01) | |
| H04W 72/12 | (2009.01) | |
| H04W 24/02 | (2009.01) | |
| H04L 1/18 | (2006.01) | |

(Continued)

(52) U.S. Cl.
CPC .......... *H04W 72/0426* (2013.01); *G06F 8/65* (2013.01); *H04L 1/0004* (2013.01); *H04L 1/18* (2013.01); *H04L 9/0816* (2013.01); *H04L 27/34* (2013.01); *H04L 63/14* (2013.01); *H04L 69/18* (2013.01); *H04L 69/22* (2013.01); *H04W 16/18* (2013.01); *H04W 24/02* (2013.01); *H04W 40/02* (2013.01); *H04W 40/244* (2013.01); *H04W 48/20* (2013.01); *H04W 72/1242* (2013.01); *H04L 1/0003* (2013.01); *H04L 1/188* (2013.01); *H04L 1/1812* (2013.01); *H04L 61/1511* (2013.01); *H04L 61/2015* (2013.01); *H04L 69/324* (2013.01); *H04L 69/329* (2013.01); *H04W 4/06* (2013.01); *H04W 4/80* (2018.02); *H04W 84/12* (2013.01); *H04W 84/20* (2013.01); *H04W 88/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 7,668,128 B1 * | 2/2010 | Benveniste | H04W 28/18 370/311 |
| 8,214,653 B1 | 7/2012 | Marr et al. | |

(Continued)

*Primary Examiner* — Ajit Patel
(74) *Attorney, Agent, or Firm* — Perkins Coie LLP

(57) ABSTRACT

The disclosed embodiments include a method performed by network node(s) of a multi-band wireless network. The method includes wirelessly interconnecting network nodes to collectively form the multi-band wireless network configured to provide network access to a client node connected to any of the network nodes. The method further includes establishing a control plane protocol that enables wireless communications of control plane data embedded in periodic frame(s) communicated by the network nodes, and managing the multi-band wireless network by wirelessly communicating the periodic frame(s) between the network nodes in accordance with the control plane protocol.

22 Claims, 20 Drawing Sheets

(51) Int. Cl.
*H04L 27/34* (2006.01)
*H04L 29/06* (2006.01)
*H04W 40/02* (2009.01)
*H04W 16/18* (2009.01)
*G06F 8/65* (2018.01)
*H04L 9/08* (2006.01)
*H04W 48/20* (2009.01)
*H04W 92/20* (2009.01)
*H04W 84/12* (2009.01)
*H04W 4/06* (2009.01)
*H04L 29/12* (2006.01)
*H04L 29/08* (2006.01)
*H04W 4/80* (2018.01)
*H04W 84/20* (2009.01)
*H04W 88/08* (2009.01)

(56) References Cited

U.S. PATENT DOCUMENTS

| | | | |
|---|---|---|---|
| 8,259,682 | B2 | 9/2012 | Dutta et al. |
| 9,525,759 | B2 * | 12/2016 | Zhang .................. H04J 13/102 |
| 10,133,867 | B1 | 11/2018 | Brandwine et al. |
| 10,142,444 | B2 | 11/2018 | Reynolds et al. |
| 10,257,868 | B2 | 4/2019 | Wang et al. |
| 10,484,980 | B1 * | 11/2019 | Jiang .................. H04W 56/001 |
| 2004/0218683 | A1 * | 11/2004 | Batra .................. H04L 27/0008 |
| | | | 375/261 |
| 2005/0233693 | A1 | 10/2005 | Karaoguz et al. |
| 2008/0065816 | A1 | 3/2008 | Seo |
| 2009/0165086 | A1 | 6/2009 | Trichina et al. |
| 2009/0214036 | A1 | 8/2009 | Shen et al. |
| 2010/0135201 | A1 | 6/2010 | Lewis et al. |
| 2011/0010543 | A1 | 1/2011 | Schmidt et al. |
| 2011/0041003 | A1 | 2/2011 | Pattar et al. |
| 2011/0173457 | A1 | 7/2011 | Reh |
| 2012/0005369 | A1 | 1/2012 | Capone et al. |
| 2012/0005480 | A1 | 1/2012 | Batke et al. |
| 2013/0185563 | A1 | 7/2013 | Djabarov et al. |
| 2013/0198838 | A1 | 8/2013 | Schmidt et al. |
| 2013/0268689 | A1 * | 10/2013 | Leucht-Roth ......... H04L 1/0079 |
| | | | 709/232 |
| 2014/0006787 | A1 | 1/2014 | Measson et al. |
| 2014/0119303 | A1 * | 5/2014 | Kwon .................. H04W 76/10 |
| | | | 370/329 |
| 2014/0123124 | A1 | 5/2014 | Gray et al. |
| 2014/0192785 | A1 * | 7/2014 | Gong .................. H04W 56/001 |
| | | | 370/336 |
| 2015/0245182 | A1 | 8/2015 | Scagnol et al. |
| 2015/0261521 | A1 | 9/2015 | Choi et al. |
| 2015/0271017 | A1 | 9/2015 | Seligson et al. |
| 2015/0363576 | A1 | 12/2015 | Medvinsky et al. |
| 2016/0036814 | A1 | 2/2016 | Conrad et al. |
| 2016/0036956 | A1 | 2/2016 | Debates et al. |
| 2016/0119052 | A1 * | 4/2016 | Frerking ............... H04W 24/02 |
| | | | 455/431 |
| 2016/0198350 | A1 * | 7/2016 | Lou ..................... H04B 17/345 |
| | | | 370/252 |
| 2016/0227440 | A1 * | 8/2016 | Forssell ................ H04L 5/0098 |
| 2016/0262163 | A1 | 9/2016 | Gonzalez Garrido et al. |
| 2016/0280370 | A1 | 9/2016 | Canavor et al. |
| 2016/0294829 | A1 | 10/2016 | Angus |
| 2016/0366229 | A1 | 12/2016 | Yamaura et al. |
| 2017/0090909 | A1 | 3/2017 | Guo et al. |
| 2017/0093645 | A1 | 3/2017 | Zhong et al. |
| 2017/0093800 | A1 | 3/2017 | Wiseman et al. |
| 2017/0104580 | A1 | 4/2017 | Wooten et al. |
| 2017/0118198 | A1 | 4/2017 | Cuff et al. |
| 2017/0126411 | A1 | 5/2017 | Piqueras et al. |
| 2017/0187537 | A1 | 6/2017 | Kim et al. |
| 2017/0195459 | A1 | 7/2017 | Costa et al. |
| 2017/0201499 | A1 | 7/2017 | McLaughlin et al. |
| 2017/0208418 | A1 | 7/2017 | Conan et al. |
| 2017/0249135 | A1 | 8/2017 | Gandhi et al. |
| 2017/0265066 | A1 | 9/2017 | Vyas et al. |
| 2017/0310655 | A1 | 10/2017 | Sethi et al. |
| 2017/0331670 | A1 * | 11/2017 | Parkvall ............... H04J 11/0056 |
| 2017/0359190 | A1 | 12/2017 | Nadathur et al. |
| 2018/0054492 | A1 | 2/2018 | Kim et al. |
| 2018/0091315 | A1 | 3/2018 | Singhal et al. |
| 2018/0183603 | A1 | 6/2018 | Liu et al. |
| 2018/0196945 | A1 | 7/2018 | Kornegay et al. |
| 2018/0239897 | A1 | 8/2018 | Ventura |
| 2018/0278625 | A1 | 9/2018 | Cammarota et al. |

\* cited by examiner

PERIODIC FRAMES FOR CONTROL PLANE DATA TO MANAGE MULTI-BAND WIRELESS NETWORKING SYSTEM

CROSS-REFERENCE TO RELATED APPLICATION

This application claims priority to U.S. Provisional Patent Application No. 62/488,258 filed on Apr. 21, 2017, entitled "INTELLIGENT MULTI-AP MANAGEMENT SYSTEM," which is hereby incorporated by reference in its entirety.

TECHNICAL FIELD

The disclosed teachings relate to management of a wireless local area network including multiple network nodes. More particularly, the disclosed teachings relate to managing a multi-band wireless networking system with beacons including control plane data communicated by the network nodes of the system.

BACKGROUND

A communication networking system that includes multiple wireless network nodes (e.g., access point devices) is a relatively recent innovation. While such networking systems have several benefits such as enabling broader wireless coverage to client nodes, they also present certain challenges related to reliability and practicality. For example, effectively operating wireless networking systems including multiple AP devices may involve the exchange of control plane data between the AP devices. Conventional techniques for networking systems communicate control plane data in a manner that is unreliable, inflexible, or complex such that managing the networking systems causes unworkable delays and disruptions. As such, deployment of control functionality in current systems often results in disruption to client services.

SUMMARY

The disclosed embodiments include a method performed by network node(s) of a multi-band wireless network. The method includes wirelessly interconnecting network nodes to collectively form the multi-band wireless network configured to provide network access to a client node connected to any of the network nodes. The method further includes establishing a control plane protocol that enables wireless communications of control plane data embedded in beacon frame(s) communicated by the network nodes, and managing the multi-band wireless network by wirelessly communicating the beacon frame(s) between the network nodes in accordance with the control plane protocol.

The disclosed embodiments also include a wireless networking device that includes two radios. The first radio is configured for communication over a dedicated wireless communication channel with other wireless networking devices that collectively form a multi-band wireless network configured to provide network access by a client device connected to any wireless networking device of the multi-band wireless network. The second radio is configured to provide network access by the client device connected to the wireless networking device of the multi-band wireless network. The wireless networking device includes a processor, and a memory communicatively coupled to the processor. The memory stores instructions, which when executed by the processor cause the wireless networking device to communicate beacon frame(s) with any of the other wireless networking devices on a control plane for managing the multi-band wireless network. The control plane establishes a protocol to wirelessly communicate control plane data embedded in the beacon frame(s).

The disclosed embodiments also include a method performed by a network node of a multi-band wireless network. The method includes obtaining beacon frames, determining that a first beacon frame includes control plane data, and that a second beacon frame does not include control plane data. The method also includes processing the first beacon frame with a control plane protocol and the second beacon frame with a data plane protocol such that transmission of the first beacon frame is prioritized over the second beacon frame. The method further includes transmitting the first beacon frame to another network node of the multi-band wireless network.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

Embodiments of the present disclosure are illustrated by way of example and not limitation in the figures of the accompanying drawings, in which like references indicate similar elements.

DETAILED DESCRIPTION

Figure 1:
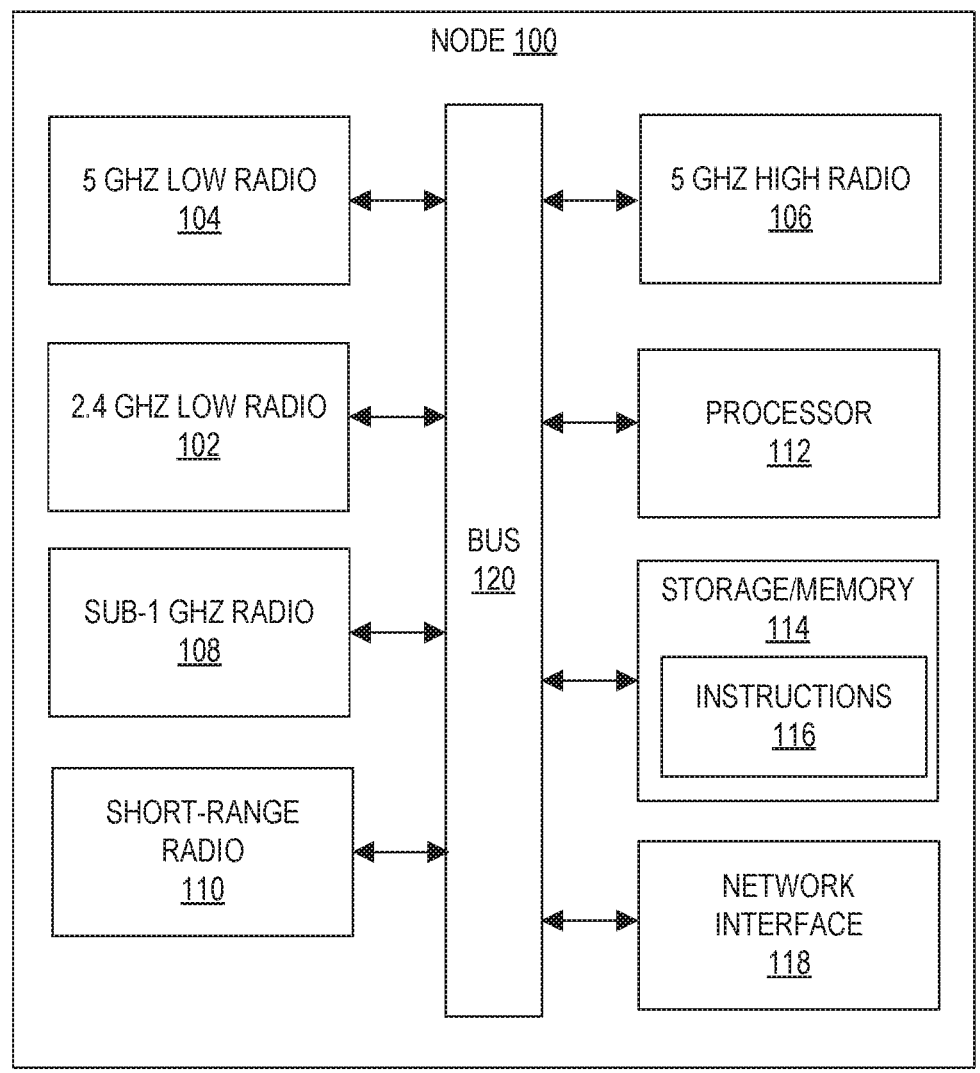
FIG. 1 is a block diagram illustrating a network node of a multi-band wireless networking system in the form of a wireless access point (AP) device.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Multi-Band Wireless Networking System

The disclosed embodiments involve a multi-band wireless networking system (the "system"). The system can be a local area network (LAN) that includes multiple nodes such as network nodes (e.g., access point (AP) devices), and client nodes (e.g., client devices) that can access the system via the network nodes. At least one of the network nodes is connected to a wide area network (WAN) (e.g., the Internet) and at least one of the network nodes operates as a router of the system. In some embodiments, the same network node can connect the system to the Internet and operate as a router of the system. The remaining network nodes can serve as satellite devices that are wirelessly connected to the router node and each other, to collectively form a dedicated backhaul network for communications exclusively between the network nodes.

The router node and the satellite nodes can both provide wireless network connections (e.g., Wi-Fi links) for client devices such as desktop computers, laptop computers, tablet computers, mobile phones, wearable smart devices, game consoles, smart home devices, etc. The router node and the satellite nodes collectively provide a single wireless networking system having broad coverage for client nodes. The system can dynamically optimize wireless connections among the network nodes for the client nodes without needing to perform reconnections to the system. An example of a multi-band wireless networking system is the NETGEAR ORBI system. An example of such systems is described in U.S. patent application Ser. No. 15/287,711, filed Oct. 6, 2016, and Ser. No. 15/271,912, filed Sep. 21, 2016, both of which are hereby incorporated by reference in their entireties for all purposes.

The network nodes of the system can include radio components that operate in multiple wireless bands such as a 2.5 GHz band, a low 5 GHz band, and a high 5 GHz band. In some embodiments, at least one of the bands can be dedicated exclusively to backhaul communications. Any other bands can be used for wireless communications among the network nodes of the system and with the client nodes connecting to the system. The wireless communications between the network nodes and client nodes are referred to herein as "fronthaul" communications.

FIG. 1 is a block diagram illustrating an embodiment of a network node of the system. Examples of network nodes include wireless AP devices, BLUETOOTH (BT) devices, signal repeaters, and signal monitors. In some embodiments, the node 100 includes radio components for a number of wireless bands such as a 2.4 GHz band radio 102, a 5 GHz low band radio 104, a high 5 GHz band radio 106, a sub-1 GHz radio 108, and a short-range radio 110. In some embodiments, any of the 2.4 GHz band radio 102 and 5 GHz low band radio 104 are "client facing" radios, and any of the a high 5 GHz band radio 106 and a sub-1 GHz radio 108 are backhaul radios.

In operation, the system can conduct an initial communications link selection when the system is initiated (e.g., turned on) to establish a communication by a client device on a band and/or channel to the system. The system can subsequently conduct a change between bands/channel for the client to maintain overall optimal operations of the system. For example, the system can cause client devices to switch between different network nodes of the system by performing handovers based on a schedule or depending on the strength of existing communications links. For example, the system can conduct a real-time dynamic channel change if needed (e.g., sudden interference on a channel).

The backhaul communications typically involve communications of control signals and/or propagation signals of data passed over the network. The control signals may include minimum information necessary to coordinate communications among the network nodes (e.g., network node 100) of the system. On the other hand, the propagation signals are much more bandwidth intensive because these communications include all files, streaming content, video game data, and other communications downloaded and uploaded over the system. For the purposes of this disclosure, the data intensive portion of communications between the network nodes is referred to as part of the backhaul communications, and the control signals are referred to as control communications or control plane data.

In some embodiments, the sub-1 GHz radio 108 and/or high 5 GHz band radio 106 may be dedicated to wireless communications among network nodes of the system. The other bands of the network node 100 may be available for wireless communications between the network nodes and client nodes. The client nodes may communicate over any number of protocols known to persons skilled in the art. Hence, the communications between the network nodes and the client nodes devices are fronthaul communications and, as such, the radios that provide these communications are referred to as "client facing." In some embodiments, the network nodes can communicate fronthaul channel selections through a dedicated backhaul channel. In some embodiments, higher priority nodes that carry higher-priority network traffic can have selection of their communications links prioritized over lower priority nodes.

The network node 100 also includes a processor 112 for executing program logic, and a memory 114 storing instructions 116 to be executed by the processor 112. In some embodiments, the network node 100 includes a network interface 118 for connecting to a wired network portion of the system and for providing overall access by the system to the Internet; however, only a router node is actually needed to connect the system to the Internet. The various components of the network node 100 are communicatively coupled via a bus 120. The network node 100 is only an example provided for illustrative purposes. However, other network nodes and other types of nodes may include fewer or more components compared to those illustrated in FIG. 1.

Figure 2:
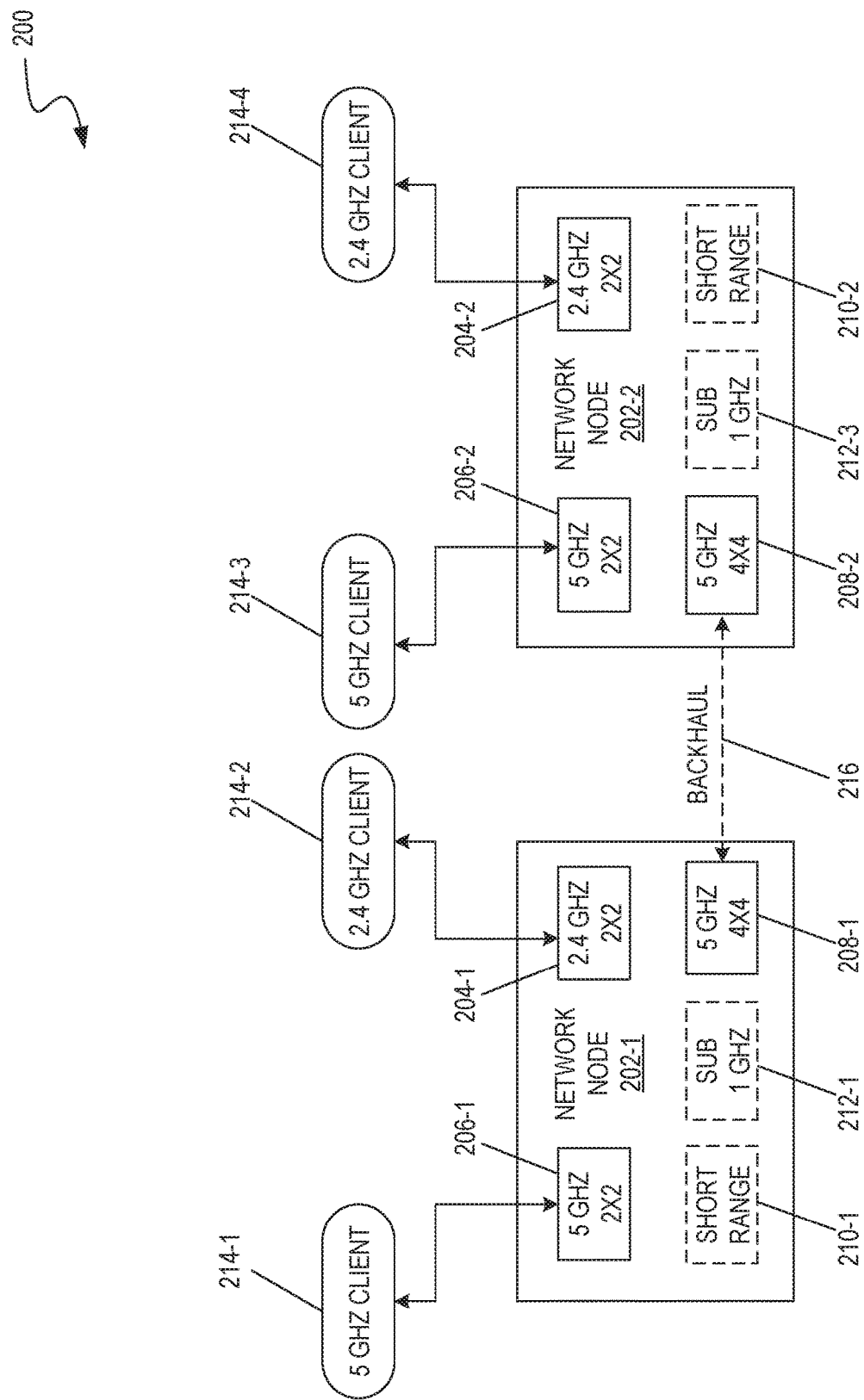
FIG. 2 is a diagram illustrating a wireless backhaul network established between two network nodes of a multi-band wireless networking system.

FIG. 2 is a block diagram that illustrates a backhaul link established between two network nodes of a multi-band wireless networking system 200. Each of the two network nodes 202-1 and 202-2 (collectively referred to as network nodes 202 and individually as network node 202) may be the same or similar to the network node 100 of FIG. 1. Those skilled in the art will appreciate that the techniques described herein can be readily implemented in various types of network configurations such as, for example, a mesh, ring, or star network. For example, the system 200 may include multiple nodes as points of a mesh network.

The network nodes 202 each have multiple radios that operate respective bands. The multiple radios include 2.5 GHz band radios 204, 5 GHz low band radios 206, and 5 GHz high band radios 208. In some embodiments, each network node 202 has a short range radio 210 and/or a sub-1 GHz radio 212. Each of the network nodes 202 can use some or all of their respective radios to communicate with respective client devices 214. At least one radio of each network node 202 can establish and/or maintain a dedicated backhaul 214 between the network nodes 202. In some embodiments, the sub-1 GHz radio and/or 5 GHz high band radio may be dedicated to backhaul communications. Those skilled in the art will appreciate that the number of network nodes and radios per network node can vary depending on an implementation.

The backhaul communications can include control communications and data communications. The control communications can include a minimal amount of critical control plane data needed to manage, coordinate, or configure nodes/communications of the system 200. For example, the control communications can include control signals originating and/or destined at different network node 202 for the system 200 to coordinate interactions of the network nodes 202. On the other hand, the data communications can include data propagated throughout the system 200 that is typically forwarded between a gateway of the system 200 and the Internet. Compared to the control communications, the data communications are more bandwidth intensive because they include files, streaming content, video game data, and other large communications downloaded and uploaded over the system 200.

The other bands of the network nodes 202 may be available for wireless communications with the client nodes 214 over any type and number of protocols. The communications between the network nodes 202 and the client nodes 214 are fronthaul communications. The radios over which fronthaul communications are transmitted or received between the network nodes 202 and the client nodes 214 are client facing radios. For example, the 2.4 GHz band radios 204 and the 5 GHz low band radios 206 are client-facing radios for fronthaul communications with the client nodes 214.

The bands of the network nodes 202's radios can include communications channels that are dynamically allocated and changed. For example, when a 2.4 GHz band is used for fronthaul communications, each network node 202 serving as an AP device of the system 200 can operate on different channels of the same 2.4 GHz band. The decision to select a suitable channel for each AP device can be made based on factors such as network topology, number of interfering devices on each channel, interference duration as percentage of time, type of network traffic supported by nodes, etc.

The bands and/or channels of the network nodes 202's radios can be dynamically allocated and changed to accommodate changing circumstances of the system 200. For example, if the backhaul channel 216 of a 5 GHz high band is interrupted or terminated, a 2.4 GHz band of the radios 204 can be used as a backup for backhaul communications. In another example, if a network node is operating in satellite mode and detects that the backhaul channel 216 of the 5 GHz high band is no longer available (e.g., due to strong interference), that satellite node's 2.4 GHz radio can switch to a scan mode to look for an uplink connection at a 2.4 GHz channel with another network node operating in router mode.

A fronthaul channel may be selected as a function of interference, number of nodes, and/or other parameters. For example, if there are multiple channels available for any network node, the network node may select a channel with less noise because it interferes less with other client nodes proximate to the network node. Further, any network nodes serving as AP devices of the system 200 may communicate fronthaul channel selections to other network nodes through the dedicated backhaul channel, to coordinate channel selection among all the network nodes. In some embodiments, the network traffic of prioritized network nodes is prioritized for fronthaul channels over other network nodes.

The network nodes 202 of the system 200 can make decisions regarding fronthaul channel selections in either a centralized or distributed way. In a distributed way, a network node can select a channel for its own use. For example, a prioritized router node can select a fronthaul channel first for its use, and each satellite node can then select a fronthaul channel for its respective use after the router node establishes a backhaul link with the satellite nodes. In some embodiments, the system 200 can optimize the channel selection process based on a regular schedule. In some embodiments, a network node that handles prioritized network traffic has a prioritized choice of a fronthaul channel over other nodes during boot-up or scheduled channel optimization of the system 200.

In a centralized way, a router node selects channels for all satellite nodes of the system 200. The selection information is communicated in control communications over the backhaul link. For example, each satellite node establishes a dedicated backhaul link with the router node or an intermediate satellite node and scans channels of fronthaul bands. Each satellite node can then send information regarding candidate fronthaul channels to the router node in the control communications via the dedicated backhaul link. The channel information can include, for example, scan results of channels in the fronthaul bands and respective levels of interference. The router node can then periodically select channels base on channel information and share the selection information in control plane data of control communications.

There are various ways to detect network nodes in the vicinity of other network nodes. For example, information indicative of a network topology can be used to detect a new network node. In another example, beacon signals that are broadcast by network nodes can be received by receiving nodes and used to detect the broadcasting network nodes in vicinity. In some embodiments, a network node uses a combination of network topology and beacon signals to detect proximate network nodes of the system.

Robust Control Plane

The reliable exchange of control plane data is critical for an interconnected wireless networking system to function. The exchange may occur and indicate when new network nodes are added/removed to/from the system, when a network topology changes, when credentials (e.g., keys, passwords, certificates) are exchanged between network nodes for security purposes, when a client device is handed off to a network node, etc.

A client node of the system can be steered to a particular network node based on a signal threshold level and a band selection process. For example, when a client device attempts to connect to the system, a network node can execute a band selection function followed by applying a signal threshold function. The steering can be managed by one or more network nodes or performed by the client node seeking to connect to the system. For example, the system may use a backhaul link to communicate between network nodes, which is prone to packet loss due to outage or collision. That is, packet loss is mitigated because connectivity losses are mitigated, which would otherwise negatively affect user level applications.

Figure 3:
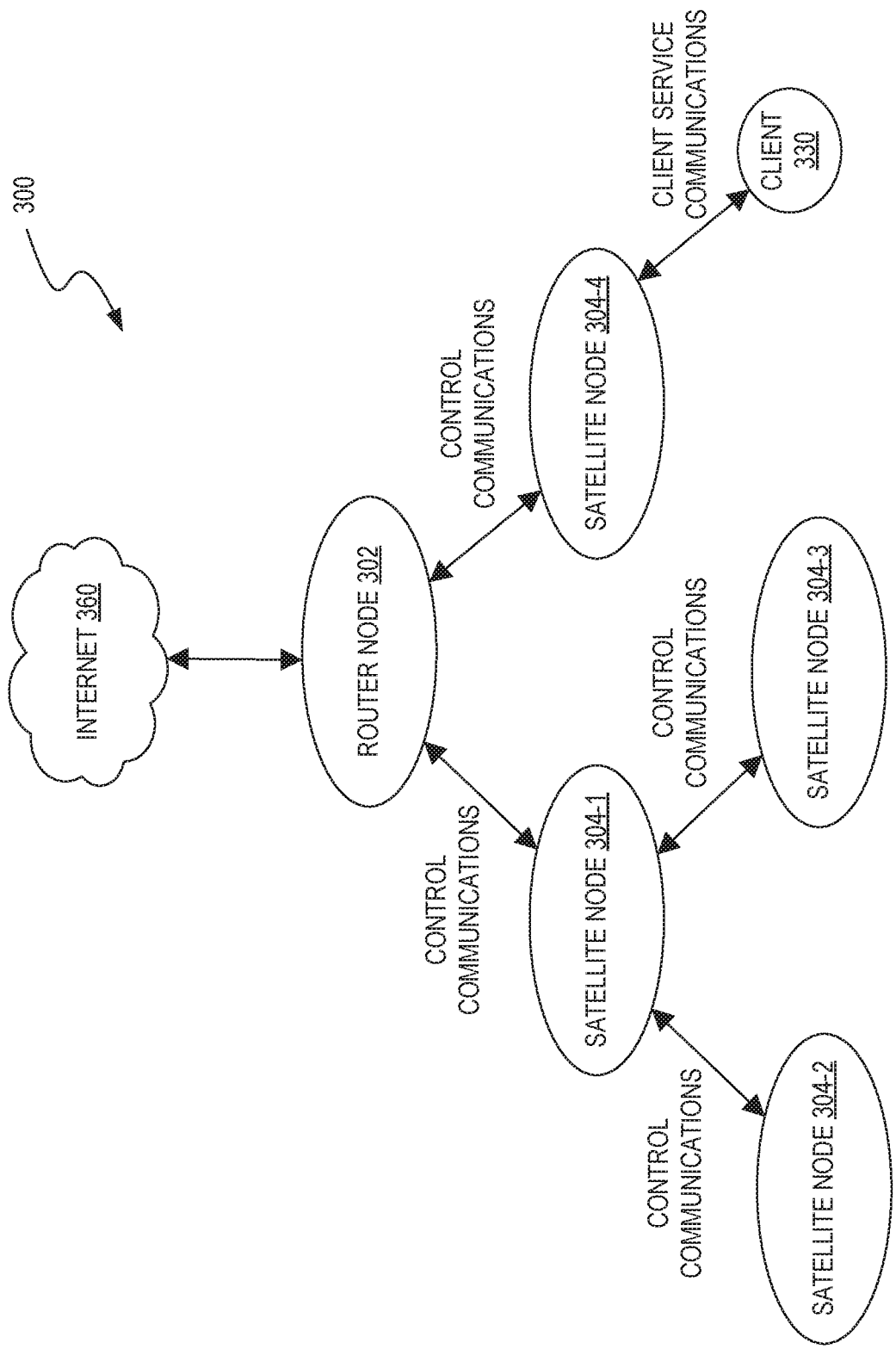
FIG. 3 is a diagram illustrating a multi-band wireless networking system providing broad wireless coverage to a client device.

FIG. 3 is a diagram that illustrates a network 300 of a multi-band wireless system (the "network 300"). The network 300 includes a router node 302 and multiple satellite nodes 304-1 through 304-4 (also referred to individually as satellite node 304). The router node 302 connects the network 300 to the Internet 360. The network nodes 302 and/or 304 can serve as AP devices that collectively provide broad wireless coverage to a client device 330. The control communications is shared between network nodes are critical for the network 300 to function. For example, any delays or interruptions of the control communications due to packet loss can significantly impact the overall quality of service provided to the client device 330.

For example, in order to provide coverage to the client device 330, the router node 302 (which connects the network 300 to the Internet 360) receives updates from the satellite nodes 304 regarding the connecting client device 330. This updates information can include, for example, an indication of which satellite node 304 the client device 330 is connected to and which Internet protocol (IP) address has been assigned to the client device 330. If the updates are not communicated accurately and in a timely manner, the network 300's operations may deteriorate and the client device 330 may lose connectivity.

Communicating control plane data between any network nodes without error is challenging even in networks that include wired links between network nodes. This challenge is further amplified where the network nodes are interconnected wirelessly. For example, the system 200 of FIG. 2 may use a backhaul channel (e.g., of the 5 GHz high band) to exchange control communications between network nodes that can be prone to packet loss due to outage or collision. Further, the IEEE 802.11 Wi-Fi standard includes protocols intended to maximize throughput with some latency expected due to packet loss. This may work for the majority of backhaul communications (i.e., packets forwarded between client devices and the Internet), but may not be effective for transmitting control communications for the reasons stated above.

Figure 4:
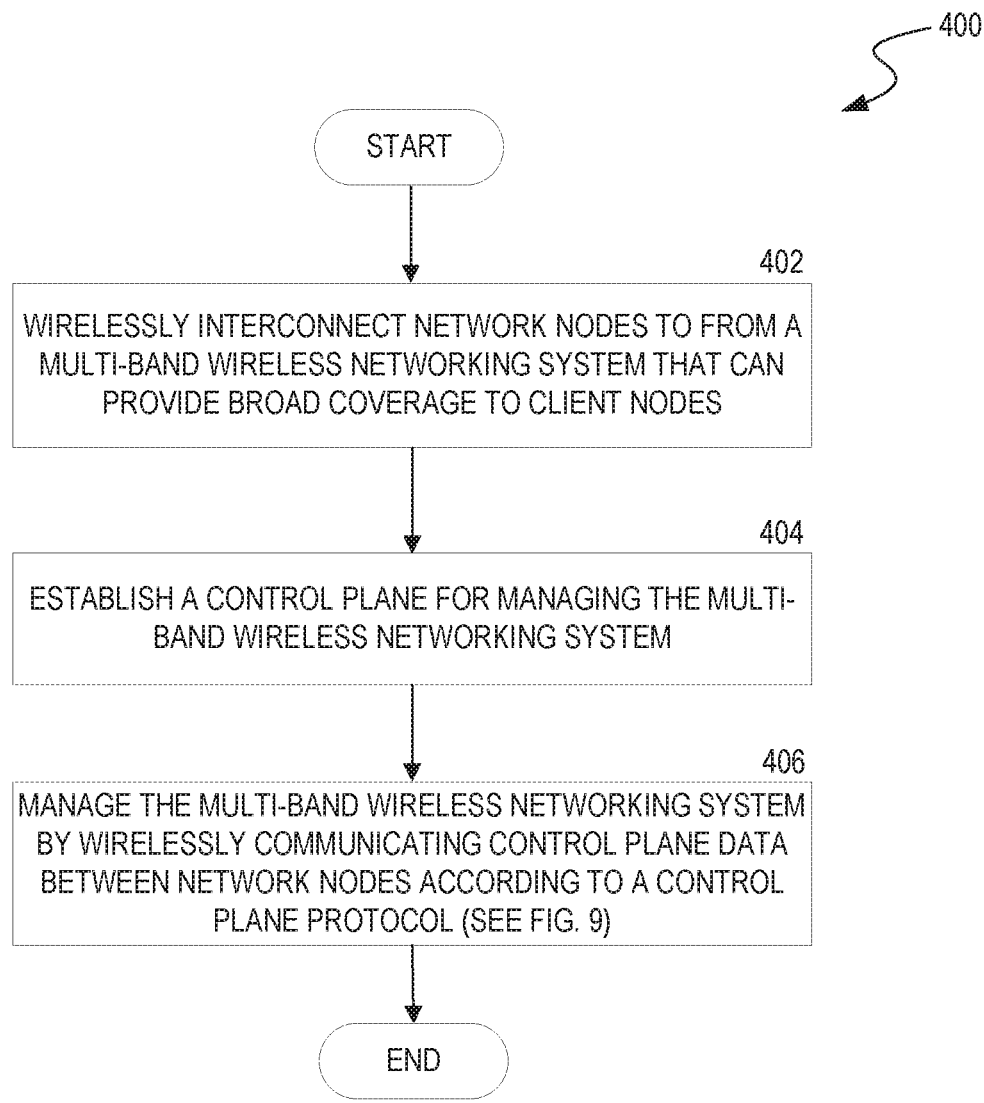
FIG. 4 is a flow diagram illustrating a process for managing a multi-band wireless networking system by using a robust control plane.

To address these challenges, the system can employ a robust control plane over which control signals can be prioritized and communicated between network nodes over a backhaul link in a manner that mitigates or minimizes the risk of packet loss. For example, FIG. 4 is a flowchart that illustrates a process 400 for managing a system with a robust control plane. In step 402, multiple network nodes are wirelessly interconnected to form the system that can provide broad coverage to a client device. As previously described, the network nodes may include a router node that provides connectivity to an external network such as the Internet, and one or more satellite nodes. The network nodes of the system may be interconnected via one or more dedicated backhaul links.

In step 404, a control plane is established for managing the system. A control plane can be defined as the portion of the system over which control and management communications between network nodes are communicated. The control plane can be conceptually differentiated from a standard data plane (also referred to as a forwarding plane) which carries the network traffic that a given network is designed to carry (e.g., traffic to/from client devices). Note that some implementations further distinguish a management plane tasked with, for example, device monitoring; however, for the purposes of this disclosure, the term "control plane" can encompass elements that belong to a management plane. In step 406, the system is managed by wirelessly communicating control plane data between the network nodes over the control plane according to the one or more protocols established by the control plane. In a wireless mesh system, it is critical to maintain an accurate network map. The information with which the network map is created and maintained up-to-date is critical information that is communicated in the control plane.

The steps of the process 400 may be performed by any one or more of the components of the example computing systems described with respect to FIGS. 1, 2, and/or 3. For example, the process depicted in FIG. 4 may be represented as instructions stored in memory that are then executed by a processing unit. The process 400 is an example provided for illustrative purposes and is not to be construed as limiting. Other processes may include more or fewer steps than depicted while remaining within the scope of the present disclosure. Further, the steps depicted in the process 400 may be performed in a different order than is shown.

Figure 5:
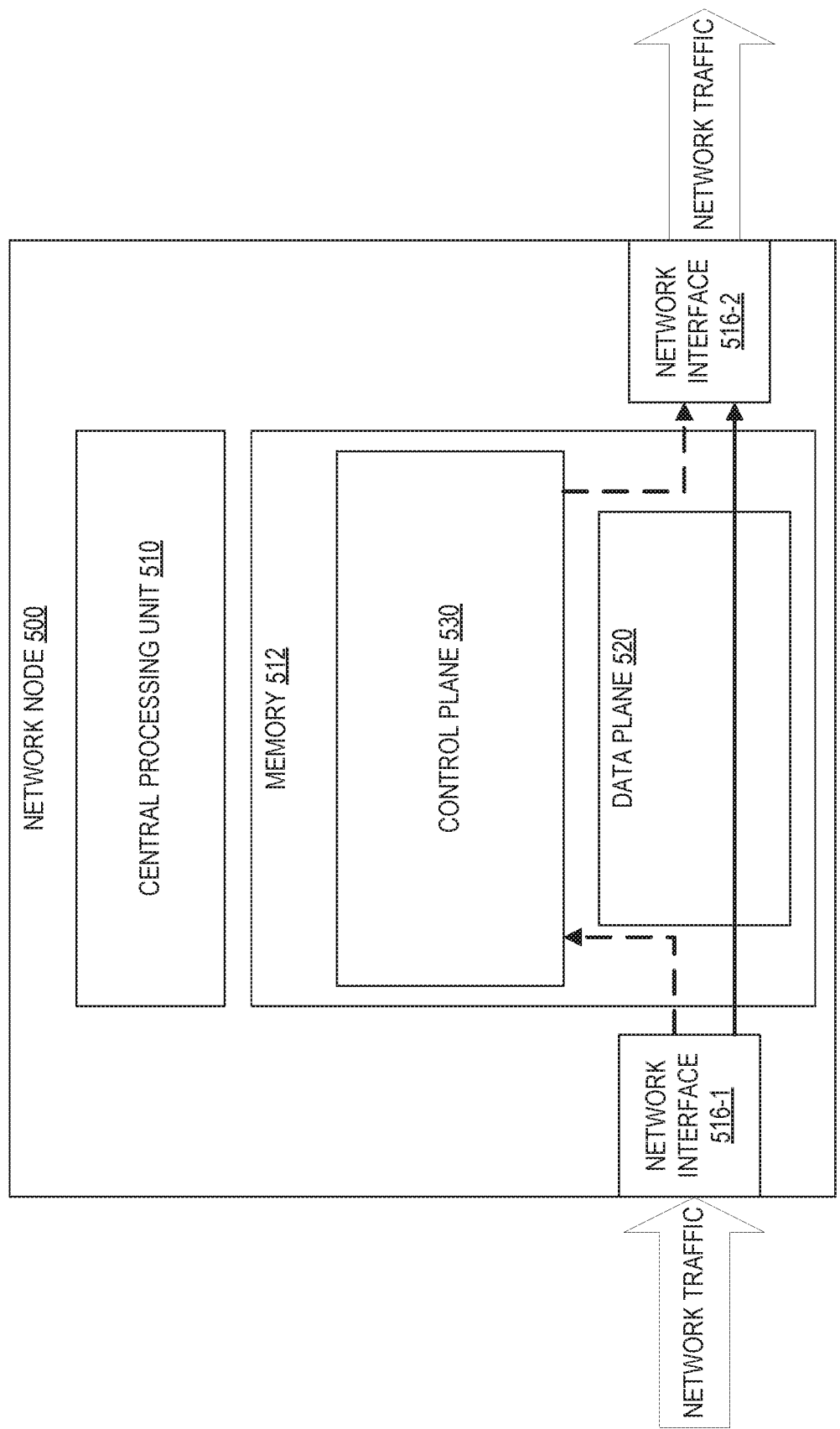
FIG. 5 is a block diagram illustrating a robust control plane of an access node of a multi-band wireless networking system.

FIG. 5 is a diagram that illustrates an example implementation of a control plane at a network node 500 (e.g., network node 100) of a multi-band wireless networking system. Typically, most of the data routing through the network node 500 (e.g., from a client device to an external network or between network nodes) includes fronthaul and/or backhaul traffic (as indicated by solid line arrows) and is processed and forwarded by a data plane 520. On the other hand, some of the traffic between nodes is control plane data for managing and maintaining operations of the system (as indicated by broken-line arrows) is processed and routed over a control plane 530. The control plane data may include, for example, control plane packets originating at other network nodes and received at network node 500 and/or control plane data generated at the network node 500 for transmission to other network nodes in the system. The control plane data may include, for example, routing protocol traffic (e.g., OSPF, EIGRP or BGP), system configuration/management traffic, and topology update traffic.

In some embodiments, the control plane 530 and data plane 520 involve processes executed by a shared CPU 510 (e.g., processor 112) using the shared resources of memory 512 (e.g., memory 114). In some embodiments, the control plane can be implemented in firmware at one or more of the network nodes forming the system. Alternatively, or in addition, the control plane can be implemented in software. For example, the control plane 530 can be implemented in and managed by software which runs above layer-1 and layer-2 of the OSI model. Both control plane traffic and data plane traffic may be received at and transmitted by the shared network interface 516-1 and 516-2 at node 500 (e.g., network interface 116).

To achieve robust data transmission characteristics needed to effectively manage a multi-band wireless network, control communications transmitted between network nodes over the control plane may be treated differently than standard backhaul communications carrying traffic to and from client devices. For example, consider again the IEEE 802.11 Wi-Fi standard that includes protocols intended to maximize throughput with an expectation of some latency due to packet loss that may occur. Accordingly, control communications intended to be transferred via a robust control plane may include indicators that allow the system to recognize the special status of communications and transmit according to protocols established for the control plane. In an illustrative embodiment, management software running above layer-2 of the OSI model at a particular network node may generate control signals in the form of control plane packets for transmission to another network node via a wireless channel (e.g., a backhaul link). The generated control plane packets may include a marker that allows lower level components (e.g., PHY hardware) to recognize the packets as control plane packets and transmit according to the protocols established for the control plane.

As previously discussed, the protocols established by the control plane for a multi-band wireless network may be configured for robust transfer of control plane data (i.e., low packet loss). For example, data transmitted over the control plane can be transmitted at robust data rates, over multiple backhauls, using hybrid ARQ, or using dedicated radios configured for robust data transmission. Example protocols for the robust transmission of data over a control plane are described in more detail below.

Figure 6A:
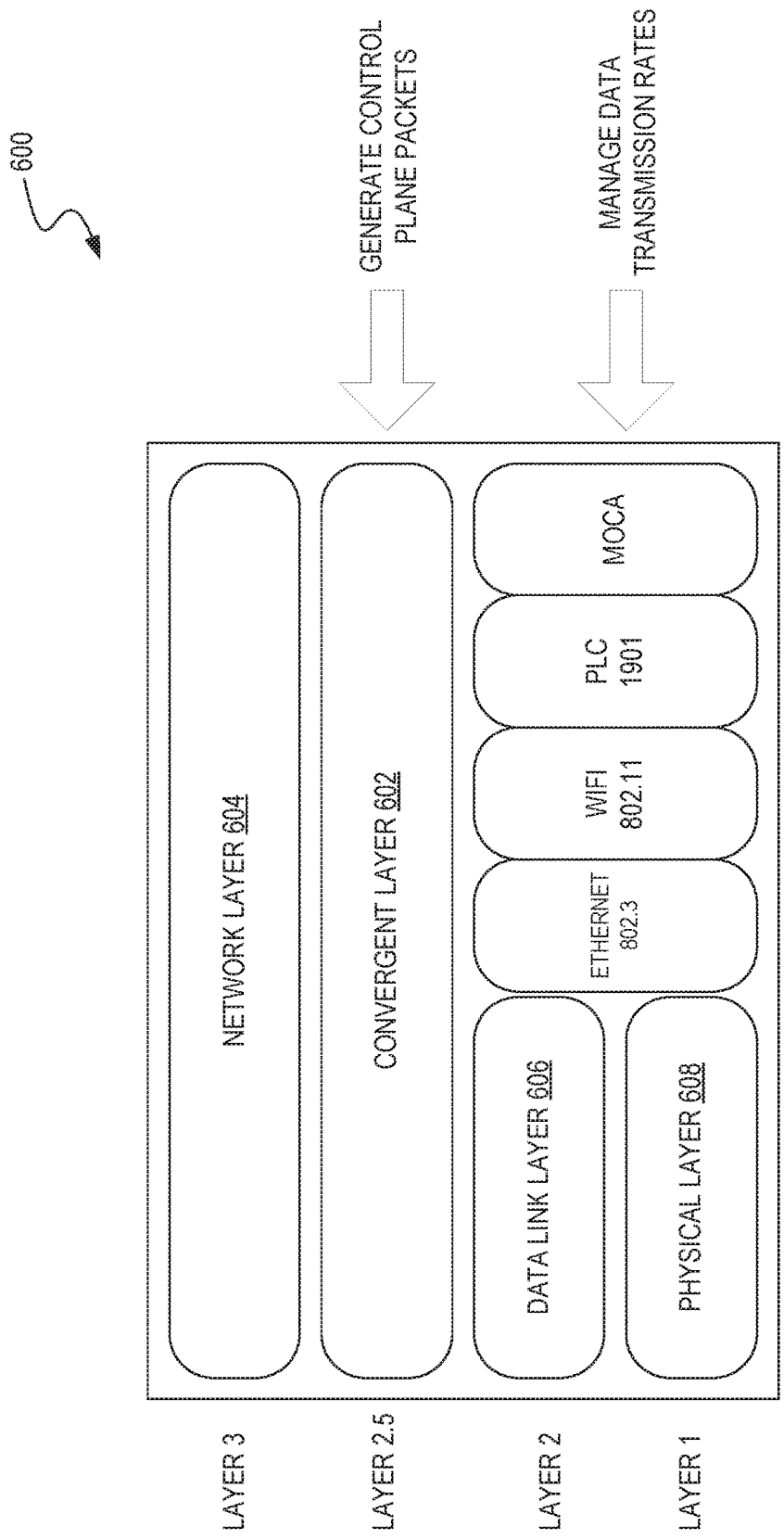
FIG. 6A is a block diagram illustrating a robust control plane in the context of a layer stack according to the open systems interconnect (OSI) architecture model.

FIG. 6A illustrates an example layer stack 600 according to the OSI model in which the control plane is implemented, at least in part, by software running on a convergent layer 602 that is between the network layer 604 and data link layer 606, and above the physical link layer 608. As an illustrative example, devices and systems that conform to the IEEE 1905.1 home network standard operate in a similar convergent layer. As shown, in some embodiments, control communications (e.g., in the form of control plane packets) are generated by a software entity running in the convergent layer 602, while the execution of protocols (e.g., robust data rates) to transmit the generated packets is managed at lower levels (e.g., the physical layer 608 and/or data link layer 606).

Figure 6B:
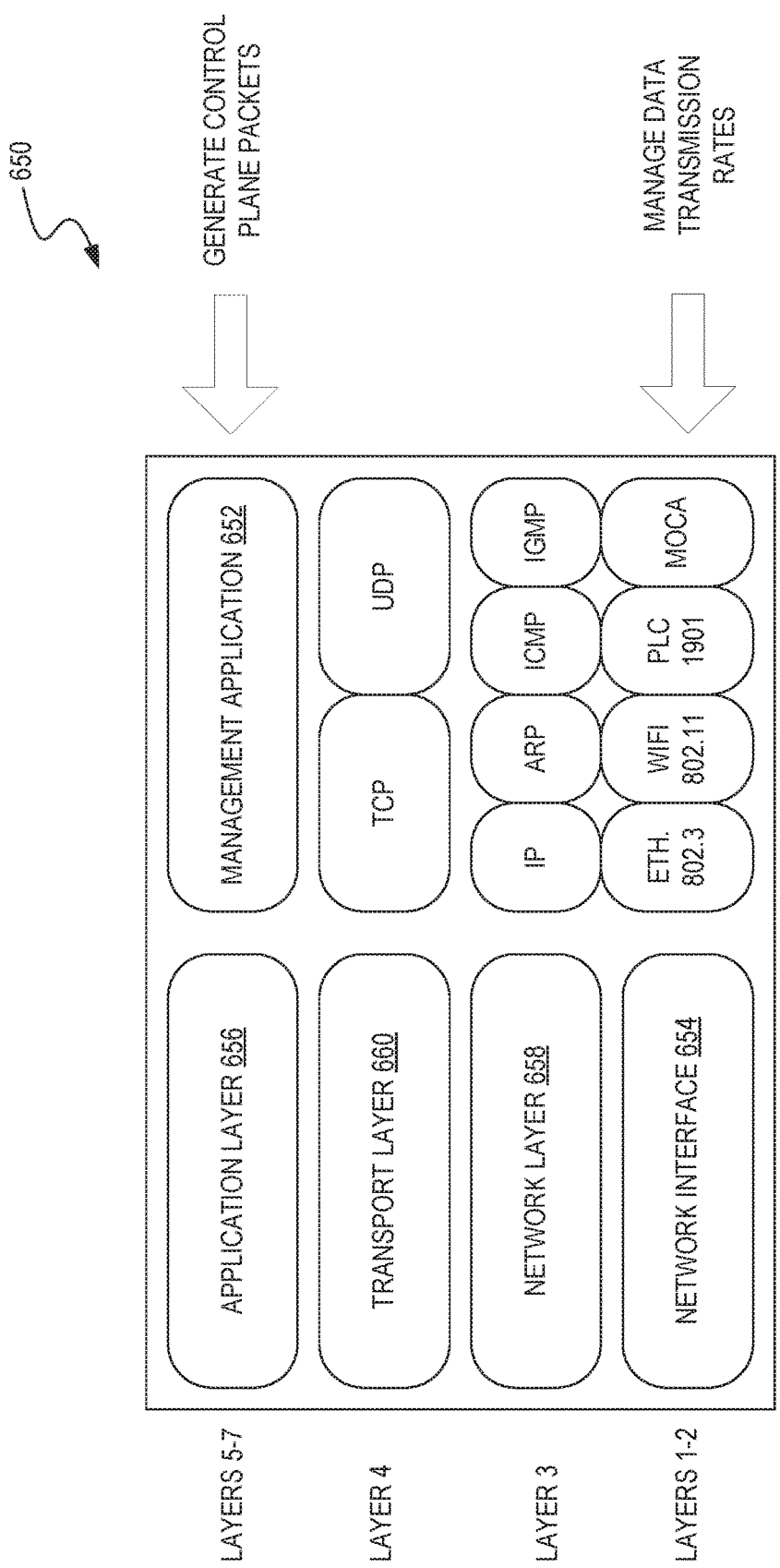
FIG. 6B is a block diagram of a robust control plane in an application layer of a layer stack according to the TCP/IP architecture model.

A person of ordinary skill in the art will recognize that FIG. 6A illustrates a non-limiting example of a robust control plane implemented in the context of a network architecture. FIG. 6B illustrates another implementation in the context of a layer stack 650 according to the TCP/IP model in which the control plane is implemented, at least in part, by a software entity in the form of a user management application 652 running in an application layer 656. The control communications (e.g., in the form of control plane packets) are generated by the management application 652 running on the application layer 656, while the execution of protocols (e.g., robust data rates) to transmit the generated packets is managed at lower levels of a network interface layer 654 and/or network layer 658 below a transport layer 660.

Implementing a robust control plane may involve identifying control plane data generated at higher levels (e.g., at a management application) for prioritized transmission at lower levels (e.g., PHY or MAC) according to any protocols established for the control plane (e.g., robust data rates, multiple backhauls). For example, a packet in a network implementing IEEE 1905.1 may be placed into a best effort queue for transmission to other devices. The best effort queue may be one of several queues implemented at a given wireless networking device. If, in a given implementation, a control plane packet is intended to be transmitted in a prioritized manner (e.g., through a best effort queue), the control plane packet can be marked so as to be recognized as a control plane packet by lower level components. In some embodiments, control plane packets may be marked to, in effect, spoof lower level components (e.g., a processor at a wireless networking device) into treating the packets similar to other prioritized traffic. For example, depending on the configuration of lower level components, a control plane packet generated by a management application may be queued in the same queue as a Wi-Fi beacon, a 1905.1 packet, a video packet, or the like, so as to be handled in a prioritized manner by lower level components. As such, the packet is not sent as beacon. Instead, it can be treated the same as beacon in terms of using hardware.

Figure 7:
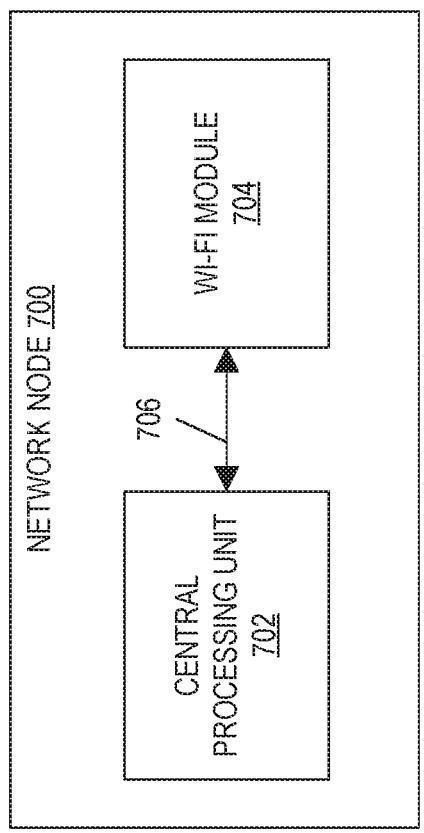
FIG. 7 is a block diagram illustrating a communication between internal components at a network node.

In some embodiments, a marker indicative of a status of a control plane packet may be included in the packet as any of a header appended to the control plane packet, a modification of an existing header of the control plane packet, and/or as information in a payload of the control plane packet. For example, FIG. 7 is a block diagram that illustrates communications between internal components at an example network node 700 (e.g., network node 100) in the form of a Wi-Fi AP device. In some embodiments, the protocols for transmitting a given packet are executed at the hardware level by a processing unit such as central processing unit (CPU) 702 (e.g., processor 110). The CPU 702 is communicatively coupled to a Wi-Fi module 704 which may include or be coupled to a radio (e.g., 2.4 GHz radio 102, 5 GHz low band radio 104, 5 GHz high band radio 106, sub 1-GHz radio 108) for wirelessly transmitting the data of the packet. As previously described with respect to FIG. 1, the CPU 702 may be communicatively coupled to the Wi-Fi module 704 via some type of internal bus 706 (e.g., PCIe).

Figure 8:
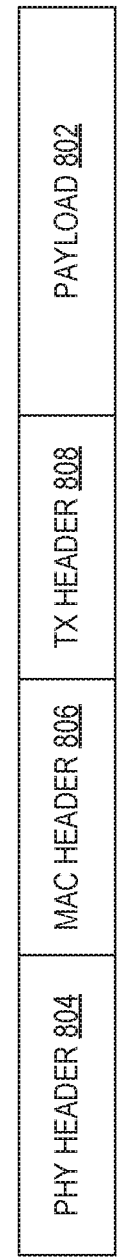
FIG. 8 illustrates a representation of an example control plane frame.

When a control plane packet is generated and sent by the network node 700, protocols associated with the transmission of that packet may be executed at the CPU 702 with core communication functions of the MAC and PHY layer performed by the Wi-Fi module 704. A software entity (e.g., a management application of the network node 700) can compose the generated packet to be recognized for prioritized transmission by lower level components. For example, FIG. 8 shows an arrangement of an example frame 800 that may include a generated control plane packet. The control plane packet may comprise at least part of the payload portion 802 and include a set of one or more headers such as a physical layer (PHY) header 804, a data link layer (MAC) header 806, and a transport layer (TX) header 808. Although not shown in FIG. 8, drivers at the network node 700 (e.g., associated with the CPU 702 and/or the Wi-Fi module 704) may have their own headers designed for software at the CPU 702 to adjust operating parameters (e.g., data rate) by the Wi-Fi module 704 for a given packet which instructs a radio what to do with the packet. Further, as previously described, a control plane packet (e.g., generated by a software entity running above layer 2) may include a marker indicative of its status. For example, a control plane packet may be marked by appending and/or modifying any of the physical layer (PHY) header 804, the data link layer (MAC) header 806, the transport layer (TX) header 808, or by modifying the payload 802.

Figure 9:
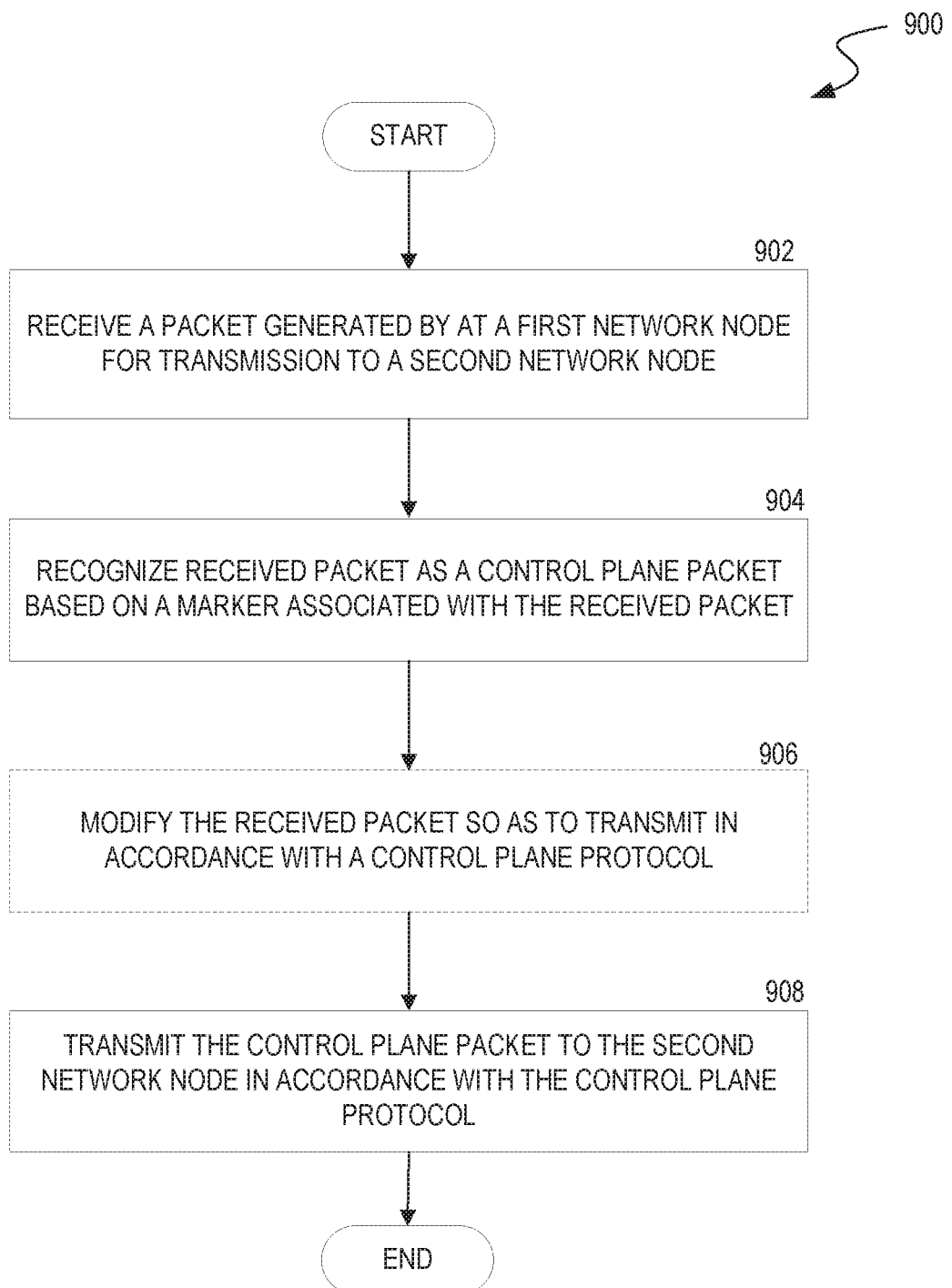
FIG. 9 is a flow diagram illustrating a process for transmitting control plane packets over a robust control plane.

FIG. 9 is a flow chart of a process 900 for transmitting a control plane packet according to a protocol established for the control plane. In step 902, a packet generated at a first network node is received. The received packet is intended to be transmitted to a second network node of a multi-band-wireless networking system. For example, a packet is generated by a software entity (e.g., a management application) at the first network node and is received at step 902 by a processor at the first network node. For example, the received packet may include payload data to be transmitted as well as a marker indicative of a status of the generated packet as a control plane packet.

In step 904, the received packet is recognized as a control plane packet based on the marker of the packet. The marker, may include an appended or modified header (e.g., PHY header, MAC header, TX header) or may be included in the payload.

In optional step 906, the processor can modify the received control plane packet so as to transmit the packet in accordance with a protocol established for the control plane in step 908. The modification may include further appending or modifying of a header associated with the packet or modifying the payload of the packet.

In step 908, the processor is caused to transmit the control plane packet by a chipset such as a Wi-Fi module according to operating parameters that inform the radio what to do with the packet. In particular, in response to recognizing the received packet as a control plane packet, the packet may be transmitted to the second network node in accordance with the protocol established for the control plane. For example, the control plane packet may be transmitted at any of a robust data rate, over multiple backhauls, using hybrid ARQ, over a dedicated control channel, or using a robust transport protocol.

Figure 20:
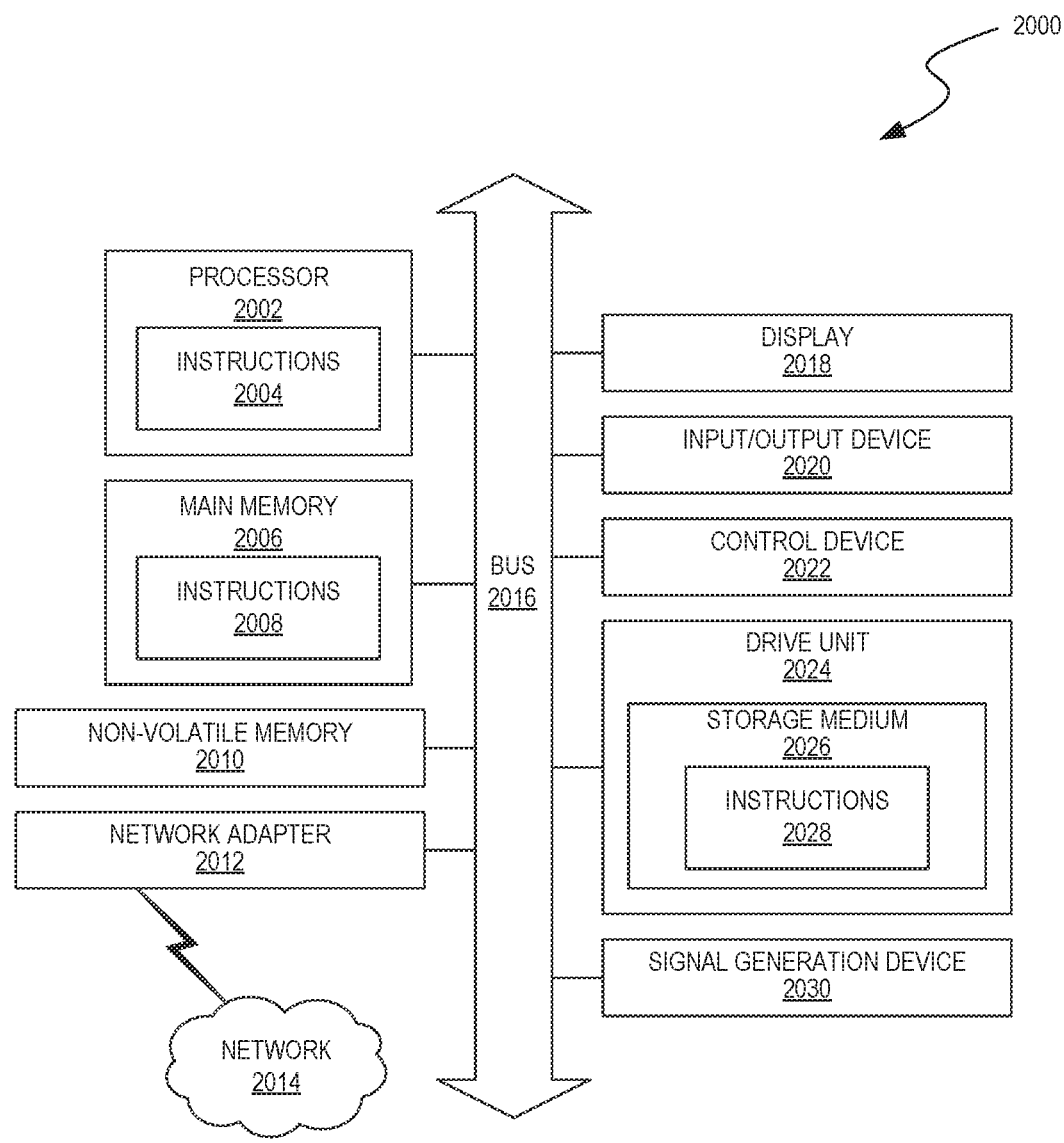
FIG. 20 shows a diagram of a computing system in which at least some features of the disclosed technology can be implemented.

The steps of the process 900 may be performed by any one or more of the components of the example computing systems described with respect to FIG. 1 or 20. For example, the process 900 may be represented in instructions stored in memory that are then executed by a processing unit. The process 900 is an example provided for illustrative purposes and is not to be construed as limiting. Other processes may include additional or fewer steps than those depicted while remaining within the scope of the present disclosure. Further, the steps depicted in the process 800 may be performed in a different order than is shown.

Depending on the implementation, a control plane may utilize protocols built into lower level components for the transmission of control plane packets in a robust manner. For example, Wi-Fi hardware generally includes protocols for transmitting Wi-Fi beacons that provide a relative guarantee of delivery of the beacon. In other words a Wi-Fi module may include hardware and/or drivers that may already be configured to transmit Wi-Fi beacons in a robust manner. Accordingly, control plane packets may be composed (e.g., by a management application) so as to mimic a Wi-Fi beacon to enable prioritized transmission. For example, a management application at a first network node may append the content of a Wi-Fi beacon to the generated control plane packet for transport with guaranteed delivery to a second network node. Note that in this example, the marker indicative of the status of the packet as a control plane packet may include, at least in part, the appended Wi-Fi beacon content. Some other marker may still be needed so that the control plane packet transmitted like a regular beacon signal is recognized as a control plane packet and not another Wi-Fi beacon upon receipt at the second network node.

As indicated above, a control plane can transmit data at robust data rates, over multiple backhauls, using hybrid ARQ, or by using dedicated radios for robust data transmission. In a robust data rates implementation, the control plane may establish protocols that govern the rates at which control communication data is transmitted. More specifically, control plane data generated at higher levels (e.g., at an application layer) may be marked for transmission at a particular data rate managed at lower levels (e.g., network interface layer). The robust data rates can minimize packet loss. For example, a suitable packet error rate for some data may be too high for control plane data to provide effective network management. Data rates may be expressed in bits per second and/or bits per symbol in the case of certain signal modulation techniques. In some embodiments, a rate control can be implemented for control communications over a control plane to achieve a predetermined criteria (e.g., bit error rate, expected transmission count, latency).

In a multiple backhauls implementation, the robust control plane may establish protocols that govern replicated transmission of control plane data to mitigate the risk of lost packets. For example, different types of control plane packets or copies of the same control plane packets may be transmitted over different bands (e.g., 2.4 GHz, 5 GHz low band, 5 GHz high high). For example, copies of control plane packets may be transmitted over multiple type of wireless and/or wired communication links (e.g., Wi-Fi, BLUETOOTH, MOCHA, Power Line Communication (PLC)).

In the Hybrid ARQ implementation, the robust control plane may incorporate hybrid automatic repeat request (hybrid ARQ or HARQ) in the transmission of control communications. Hybrid ARQ may refer to the combination of forward error correction (FEC) with automated repeat request (ARQ). Automated repeat request (also referred to as automated repeat query) uses acknowledgements by a receiving entity that transmitted data (e.g., a packet) has been successfully received. If the acknowledgement from the receiving entity is not received by the transmitting entity within a certain period of time, the transmitting entity re-transmits the data. In a hybrid ARQ scheme, the transmitting entity additionally encodes the piece of data with an FEC code. This FEC code is transmitted automatically to the receiving entity or at the request of the receiving entity. The FEC code is then used to correct, if possible, any errors in the piece of data introduced during the transmission process, while the ARQ process described above is used as a fallback position if any introduced errors are not correctable.

In a dedicated backhaul implementation, the control plane may establish protocols that utilize a dedicated channel (i.e., outside of the standard backhaul) for some or all control plane communications. For example, referring back to FIG. 1, the sub-1 GHz radio 108 of the network node 100 may be dedicated for transmitting and receiving control plane communications.

The sub-1 GHz radio 108 may operate at frequencies between 433 MHz through 928 MHz, which includes two regulated industrial, scientific, and medical (ISM) bands referred to as the 433 MHz band and the 900 MHz band. These bands range between 433.05 MHz to 434.79 MHz and 902 MHz to 928 Mhz. In some embodiments, use of a dedicated control channel may be limited to the transfer of particular critical control plane communications that enable consensus between network nodes to thereby allow the system to operate effectively. Examples of critical control communications may include timing synchronization, roaming coordination, or provisioning of new nodes as AP devices. In some embodiments, control plane packets may further include a marker indicative of a priority status (e.g., critical, non-critical) in addition to a marker indicative of a status as a control plane packet.

In alternative transport protocols, the robust control plane may establish the use of transport protocols configured for low latency and guaranteed delivery. Data transmission at the transport layer typically employs transmission control protocol (TCP), which guarantees delivery but introduces latency, or user datagram protocol (UDP), which offers lower latency but has no guarantee of delivery. Hence, either of these two transport protocols are problematic for communicating critical data necessary for a network to function properly. On the other hand, alternative transport protocols may be used for transmitting control plane data. An example includes a real-time transport protocol (RTP) such as the RTP Control Protocol (RTCP), which is typically used for video control transport but is designed for low latency with guarantee of delivery. For example, in a streaming video application, certain control communications (e.g., to pause the video) may require guarantee of delivery. Similarly, control plane communications used to communicate control messages between nodes in a multi-band wireless networking system may be transmitted using some variation on RTCP or a proprietary transport protocol configured around similar goals (i.e., low latency, guarantee of delivery).

Beacons or Periodic Frames Including Control Plane Data

As introduced above, maintaining proper performance of a multi-band networking system and thereby reducing security risks requires sharing the current system status information among network nodes that serve client nodes. Examples of system status information include routing protocol information, system configuration information, network topology information, etc. These examples belong to a category of information that can be included in the broadly defined "control plane data" that is used by network nodes to manage the system's resources to maintain proper performance while avoiding security risks.

For example, a client device may disconnect from a first network node to connect with a second network node without informing the first network node about the change. The system then needs to forward all packets for the client device to the second network node even though the first network node is unaware of this change. This situation typically results in packet loss unless the system updates the first network node about the change. As a result, certain applications experience noticeable performance degradation.

The IEEE 1905 standard is an example of a protocol that supports management capabilities for wireless and wired home networking systems. The IEEE 1905.1 standard defines a network enabler for home networking that supports wireless and wireline technologies IEEE 802.11 Wi-Fi, IEEE 1901 (HomePlug, HD-PLC) powerline networking, and IEEE 802.3 MoCA. IEEE 1905.1 devices run an abstraction layer (AL) hiding the diversity of MAC technologies. This sub-layer exchanges control message data units (CMDUs) with 1905.1 neighbors. The CMDUs are communicated directly over Layer 2 of the different supported technologies without the need for an IP stack. This abstraction layer provides a unique and persistent address to identify a device, which is useful when multiple interfaces are available and to facilitate seamless switching of traffic between interfaces. The management of an IEEE 1905.1 device is simplified with a unified AL management entity and with the use of a data model accessible with CWMP (Broadband Forum TR-069).

The architecture for the abstraction layer is based on two IEEE 1905.1 service access points accessible to upper layers: a IEEE 1905.1 MAC SAP and a IEEE 1905.1 AL management entity (ALME) SAP. An IEEE 1905.1 protocol is used between ALMEs to distribute different types of management information such as topology and link metrics. An IEEE 1905.1 CMDU frame consists of an 8 octets header and a variable length list of TLVs (type-length-values) data elements which is easily extendable for future use. TLV is an encoding scheme used for optional information element in a certain protocol. Vendor specific TLV are supported via TLV Type 11.

Embodiments of the disclosed multi-band networking system can implement IEEE 1905 with a management application that generates or processes control plane data. However, IEEE 1905 does not consider control frames as high-priority packets in a system that includes multiple network nodes (e.g., AP devices). Instead, packets are simply sent to a particular queue and then transmitted out. Specifically, existing protocols use wired connections for communicating control plane data of wireless local area networks (LANs) such that there is no need to wirelessly communicate control plane data. In particular, existing wireless networks use a single AP device such that there is no need to communicate control plane data between AP devices. However, a multi-band wireless networking system includes multiple network nodes to expand and/or improve coverage over larger areas. As a result, existing protocols do not include techniques for managing and coordinating a system of multiple AP devices.

The disclosed embodiments can overcome these drawbacks by modifying components of standard protocols to process control plane data for a multi-band networking system. For example, the network nodes can run a management application that acts on layer-2 packets with MAC headers. The modified components can add dedicated queues meant to treat particular packets marked for particular queues in particular ways to manage the system. In particular, the network nodes can recognize packets marked for particular queues and treat any queued packets based on defined procedures for those queues. For example, a modified driver can evaluate packet headers to identify packets marked for particular queues, and then any queued packets can be processed in accordance with defined procedures of the particular queues.

Specifically, a standard packet header may include used and unused bytes (sometimes referred to as information elements). In some embodiments, the information elements could embed management TLVs. The information elements can be adapted to include control plane data for the system. A transmit descriptor header of a beacon frame has parameters that can be set to instruct a radio how to process control packets. Hence, the disclosed embodiments can repurpose existing parameters to identify packets that contain control plane data so that a network node could then extract the control plane data from the packet.

Alternatively, a system can be modified to generate a new type of packet dedicated for control plane data. For example, a network node could generate a packet and mark it as a control data packet. Another network node can recognize the packet as a control data packet, extract its contents, and provide special treatment for the management packet. As such, the control packet can include a marker used to identify a management packet and act accordingly to prioritize delivery.

The disclosed embodiments can improve robust communications of control plane data by using regular beacon frames or periodically transmitted packets embedded with control plane data (also referred to herein as beacon control frames). For example, a beacon frame is typically prioritized over other packets, broadcast at a lower data rate, and with increased transmit power to cover a larger range. For example, network nodes can be modified to embed control plane data in Wi-Fi beacon frames or BLUETOOTH (BT) periodic packets such as advertising packets rather than relying on dedicated control channels. Therefore, the beacon or periodic frames can broadcast control information without needing bidirectional communications. As such, network nodes can maintain operations without needing acknowledgements from other network nodes that received the control plane data. In some embodiments, the network nodes could still use standard bidirectional channels to communicate any response or acknowledgements if so desired. As such, control plane data can be communicated over a combination of standard control channels and/or Wi-Fi beacon frames and/or BT periodic packets.

BT protocols include basic rate/enhanced data rate (BR/EDR) and low energy (BLE). BR/EDR enables continuous wireless connections and uses a point-to-point (P2P) network topology to establish one-to-one device communications typically for streaming media. In contrast, BLE enables short-burst wireless communications over longer ranges. BLE offers reduced energy utilization and an extended range compared to BR/EDR or other means of communication that require pairing. A typical BT packet includes an identifier and several bytes that are typically used for device localization, tracking, and location-based services such as a check-in or push notification.

BLE can use multiple network topologies including P2P, broadcast, and mesh. P2P enables one-to-one device communications commonly used for data transfer in connected devices. Broadcast enables one-to-many device communications commonly used for localized information sharing (e.g., beacons) such as localization services. Mesh enables many-to-many device communications commonly used for creating large-scale device networks for network nodes to reliably and securely communicate with one another.

BT has a short-range because it was designed for establishing a wireless low-power and ongoing connection between devices (e.g., to stream media). For example, referring back to FIG. 1, the short-range radio 110 can be an example a BT radio. To improve the use of BT packets to carry control plane data, the transmission power and frequency of BT packets could be increased. As such, BT packets with control plane data can be part of robust control layer that can dynamically change its periodicity at different times (e.g., more frequently while setting up and less frequently thereafter).

Figure 10:
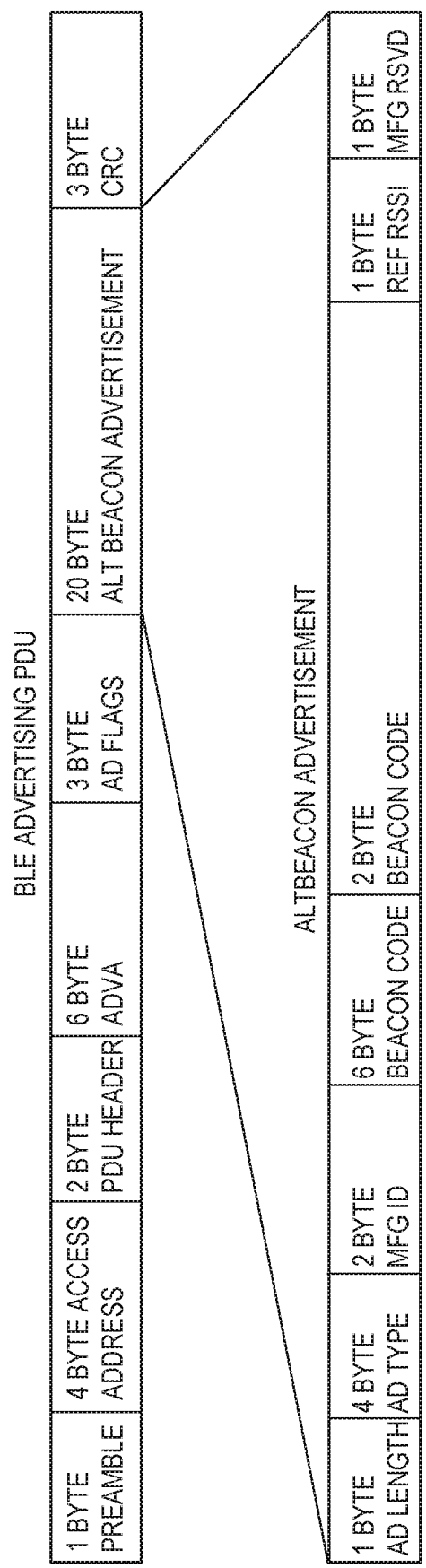
FIG. 10 illustrates an example of a BLUETOOTH low energy advertising protocol data unit (PDU) that can include control plane data.

BLE hardware is designed to communicate relatively low amounts of data over longer ranges. As such, BLE periodic packets could be adopted to embed control plane data that is communicated by network nodes to manage the system. FIG. 10 illustrates an example of a BLE advertising protocol data unit (PDU) (e.g., a BLE advertising frame) that can be employed to include control plane data. In this example, the AltBeacon spec is 28 bytes, of which 26 are user modifiable. The first two bytes of the AltBeacon are not user modifiable but are set by the BLE stack.

On the other hand, Wi-Fi beacons are an example of longer range wireless communications. A standard Wi-Fi beacon signal is more robust that other transmitted data because the hardware that transmits Wi-Fi beacons has a dedicated queue with a guaranteed timing. A standard Wi-Fi beacon is sent at a lower (more robust) data rate and can be given priority over other data. Wi-Fi beacons are not used for communicating control plane data because dedicated wired control channels are preferred in conventional networking systems. However, these existing techniques are too inflexible, complex, or burdensome to implement in a multi-band wireless networking system that has multiple network nodes.

Wi-Fi Beacons Including Control Plane Data

The IEEE 802.11 Wi-Fi standard describes capabilities for transmitting beacon frames. A standard Wi-Fi beacon is used for device discovery, implemented in MAC hardware, usually sent periodically at a low data rate (e.g., 10 frames per second), and prioritized over other data packets. Wi-Fi hardware can also distinguish between beacons of different networks. For example, an enterprise network node may belong to a guest network, administrative network, employee network, and other networks that each transmit respective Wi-Fi beacons. Moreover, Wi-Fi hardware can prioritize Wi-Fi beacons to enable reliable delivery of certain beacon frames such as priority and hardware packets.

The disclosed embodiments can modify standard Wi-Fi beacons to communicate control plane data for a multi-band networking system. For example, control plane data can be embedded in standard Wi-Fi beacons, which can be generated and distributed by multiple network nodes of the system. As such, Wi-Fi beacons can facilitate the management of networking operations. For example, a network node can scan channels for Wi-Fi beacons and extract information of management resources including the capabilities and configuration of other network nodes. This allows the system to choose how to optimally connect network nodes and client nodes. Further, a network node can continue to scan for Wi-Fi beacons to identify alternative resources or options as they become available or as needed.

Wi-Fi beacons can facilitate various network management operations. For example, a network node that receives Wi-Fi beacons from another network node of the system can use the Wi-Fi beacon's timestamp to update its internal clock. Wi-Fi beacons of one network node can also inform other network nodes of imminent configuration changes such as data rate changes, and enable network nodes to have power saving modes. For example, network nodes can hold packets of other network nodes that are sleeping. As such, a traffic indication map of a Wi-Fi beacon can inform a network node that another network node has packets waiting for delivery.

The standard Wi-Fi beacons are typically communicated in a static manner at a regular predictable period. In contrast, however, control plane data of a multi-band network system tends to change dynamically. However, embodiments can designate Wi-Fi beacons that include control plane data for special treatment to overcome the shortcomings of standard Wi-Fi beacons. For example, a network node can run a modified driver that bifurcates traffic for a data plane or a control plane. As such, a Wi-Fi beacon with control plane data can have prioritized transmissions and increased frequency to improve delivery compared to standard communications.

Figure 11:
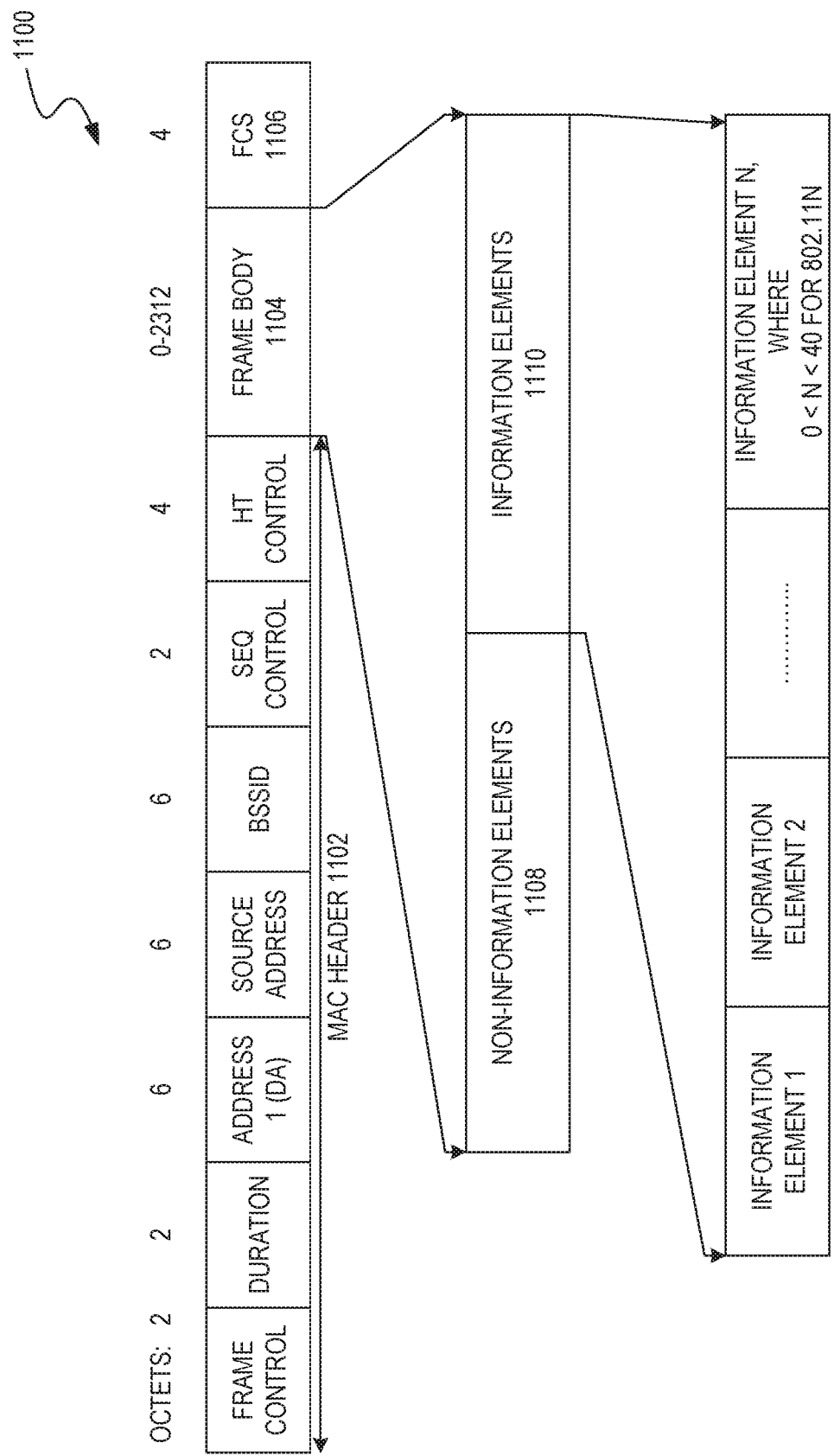
FIG. 11 is a block diagram illustrating a beacon frame format for a network management system of a multi-band wireless networking system.
}

FIG. 11 is a block diagram illustrating a standard Wi-Fi beacon frame 1100 ("Wi-Fi beacon 1100") that can be modified to facilitate management of a multi-band wireless networking system. The Wi-Fi beacon 1100 has a MAC header 1102, a frame body 1104, and a frame check sequence (FCS) 1106. The MAC header 1102 includes fields for frame control, duration, destination address, source address, basic service set identifier (BSSID), sequence control, and a high throughput (HT) control.

The frame body 1104 includes non-information elements (non-IEs) 1108 and information elements (IEs) 1110. Examples of the non-IEs 1108 include a timestamp, beacon interval, capability information, service set ID (SSID), supported rates, frequency-hopping (FH) parameter set, direct-sequence (DS) parameter set, contention-free (CF) parameter set, infrastructure basic service set (IBSS), or traffic indication map (TIM). These non-IEs have different functions that can facilitate management and coordination of a multi-band networking system. For example, a timestamp can be used to synchronize local clocks of network nodes, a beacon interval defines the time interval between beacon transmissions, and capability information can include information about the capability of a particular network node or the system to which it belongs.

The IEs 1110 are network-specific or vendor-specific. As such, an IE can be referred to as a network-specific IE or a vender-specific IE (VIE). The VIEs of a Wi-Fi beacon can be generated by a network node to include control plane data used to manage or coordinate network nodes or communications of the system. In some embodiments, the network nodes can communicate the Wi-Fi beacons at defined intervals, and peer network nodes can propagate the Wi-Fi beacons or modified versions of the Wi-Fi beacons to other network nodes. For example, a network node can wait a period of time after receiving a Wi-Fi beacon from a peer node and then transmit the Wi-Fi beacon from the other network node or transmit its own Wi-Fi beacon, unless another network node has already sent Wi-Fi beacon that requires the network node to wait for expiration of a new time period before sending its Wi-Fi beacon. In this way, the process of sending beacon frames can be rotated among peer network nodes, while ensuring that Wi-Fi beacons are being sent out.

In some embodiments, the IEs could embed management TLVs of IEEE 1905.1. In some embodiments, any number of VIEs can be added to a Wi-Fi beacon and a VIE can include any type of content such as critical information, information about associations between network nodes and client nodes, bands used for communications, information about a network topology, or any control plan data. Moreover, a VIE can include client-specific information such as the capabilities of client devices. As such, a VIE can be used to determine the origin of a Wi-Fi beacon or generate a product based on the VIE's content. Although described as a procedure for embedding content into Wi-Fi beacons, embodiments also include a procedure for defining dedicated Wi-Fi beacons that include the control plane data used to facilitate management of the network.

For example, in some embodiments, a Wi-Fi beacon can be readily extended by appending it with VIEs that include control plane information. Thus, VIEs can carry control plane data associated with any network nodes, connection types of network nodes, client devices connected to network nodes, client-specific information, band availability, channel availability on each band, and other information related to the management of network nodes and coordination of control plane data that would otherwise be communicated over a dedicated control channel.

In some embodiments, a VIE can include an indication of the capabilities of nodes. For example, a VIE can identify a network node operating as an AP device, and particular types of AP device operations. In another example, a network node can use Wi-Fi beacons to determine whether its source device is a camera device and capabilities of the camera device, including whether the device supports camera sensors. As such, a network node can treat the identified device accordingly.

In some embodiments, a beacon interval can be changed dynamically as needed to optimize the performance of the system. Increasing the beacon interval can cause Wi-Fi beacons to be sent less frequently, which reduces the load on the system and increases throughput by network nodes. However, increasing the beacon interval may delay establishing any associations between nodes and roaming processes as network nodes scanning some channels could potentially miss Wi-Fi beacons on other channels. Alternatively, decreasing the beacon interval causes beacons to be sent more frequently. This increases the network load on the system, decreases throughput by network nodes, but results in rapid associations and roaming processes.

In some embodiments, beacon frames can be sent in accordance with a carrier-sense multiple access with collision avoidance (CSMA/CA) algorithm. This means that if a network node is currently sending a frame when a Wi-Fi beacon needs to be sent, sending the Wi-Fi beacon or frame must wait. Hence, Wi-Fi beacons may not be sent as frequently as a beacon interval indicates. However, network nodes are able to compensate for this difference by inspecting timestamps of Wi-Fi beacons when they are actually sent.

Figure 12:
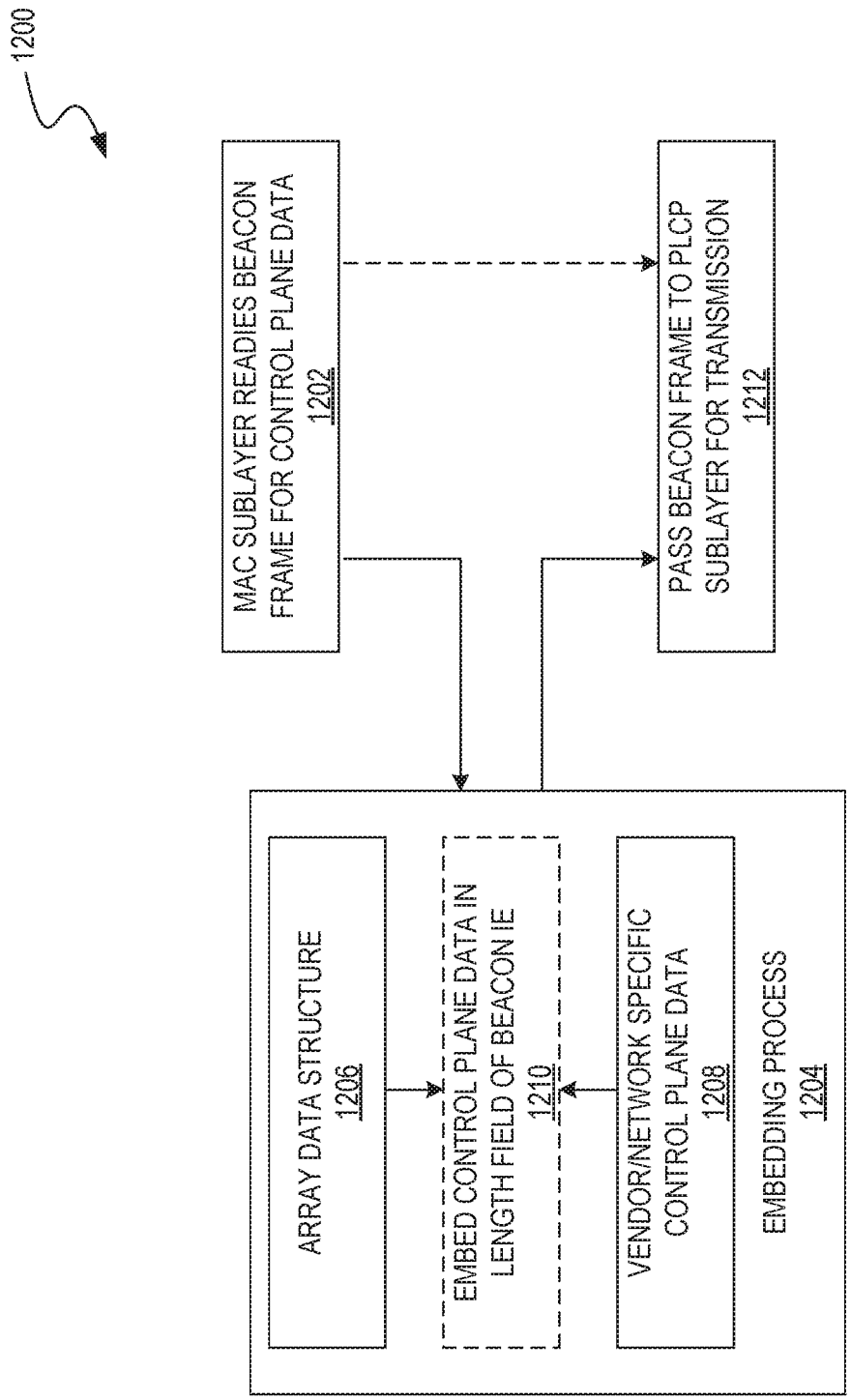
FIG. 12 is a block diagram that illustrates a process of a transmit-side of a network node for embedding control plane data into a Wi-Fi beacon.

FIG. 12 is a block diagram that illustrates a process of a transmit-side of a network node for embedding control plane data into a Wi-Fi beacon. The process 1200 may be performed by a management application and modified driver of a network node, which controls operational parameters of the network node to embed control plane data into Wi-Fi beacons. For example, a management application can instruct the modified driver application which, in turn, instructs firmware on a chip that causes MAC hardware to select Wi-Fi beacon frames for embedding control plane data. Hence, the MAC layer can still parse and queue data but the modified driver can embed control plane data into Wi-Fi beacons, append Wi-Fi beacons with control plane data, or modify Wi-Fi beacons used to facilitate management of the system.

In step 1202, a MAC sub-layer readies selected Wi-Fi beacons for control plane data (i.e., adds the required VIE that includes control and management content of a multi AP network). For example, Wi-Fi beacons can be selected based on a variety of factors including a schedule or the vendor-specific operational parameters. The selected Wi-Fi beacons are transferred to the embedding module that performs an embedding process 1204. In contrast, the Wi-Fi beacons that are not selected for embedding information are passed directly to a physical layer convergence procedure (PLCP) sub-layer for transmission by a transmitter in step 1212.

The information embedding module can modify Wi-Fi beacons and embed information (e.g., control plane data) into Wi-Fi beacons. For example, in step 1206, an array data structure of the selected Wi-Fi beacon's frame body can be replaced. The array could have contents including topology changes, client capabilities, forwarding table, network credentials, etc. In step 1208, vendor or network specific control plane data can be embedded into the selected Wi-Fi beacon. In optional step 1210, the control plane data is embedded into a length field of the selected Wi-Fi beacon. The Wi-Fi beacon that includes embedded control plane data is then passed to a PLCP sub-layer for transmission by the transmitter in step 1212.

Figure 13:
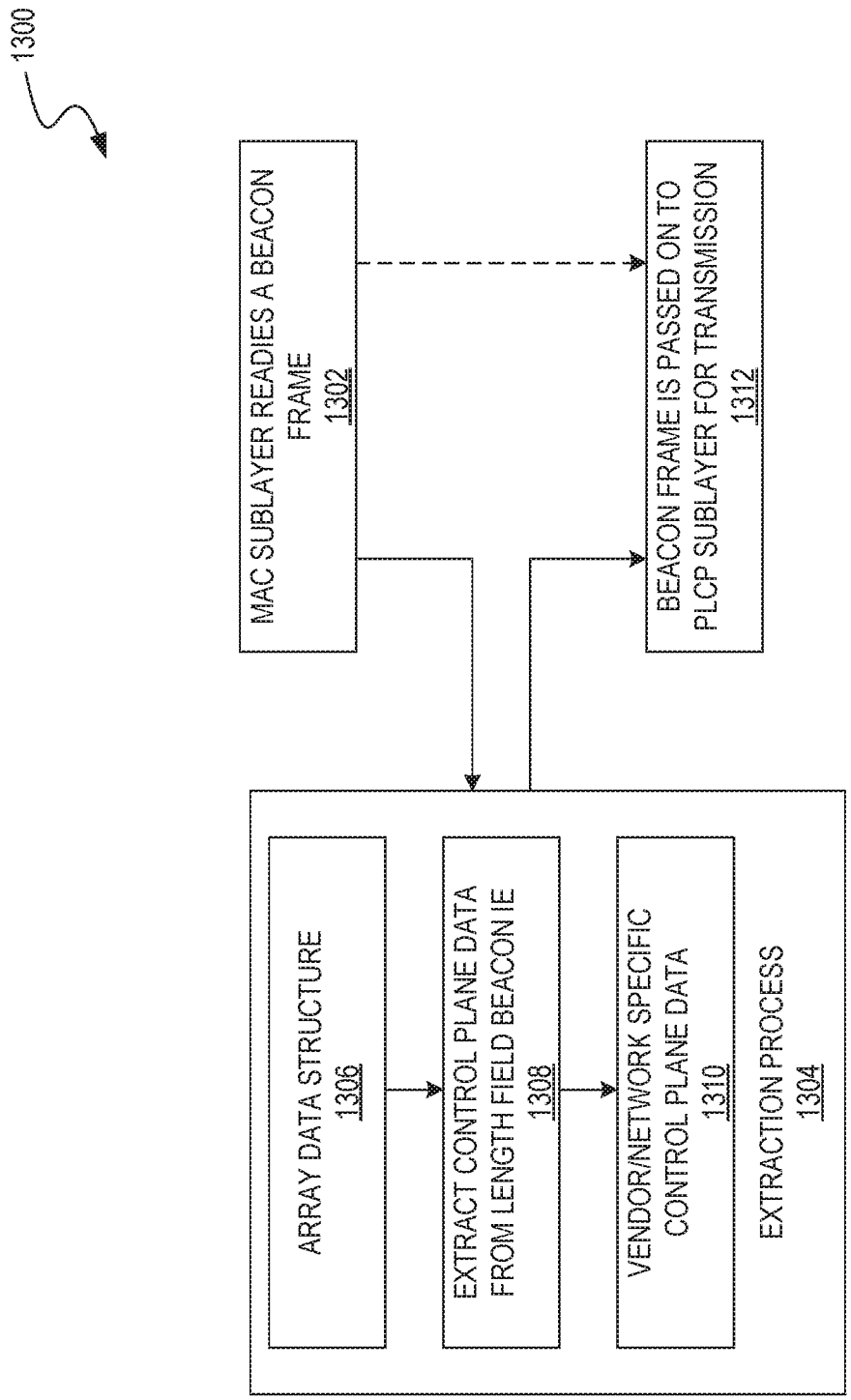
FIG. 13 is a block diagram that illustrates a process of a receive-side of a network node for extracting control plane data from a Wi-Fi beacon.

At a receive side, the management application and modified driver of a network node can perform the reverse steps of the process 1200 to extract control plane data from Wi-Fi beacons. For example, FIG. 13 is a block diagram that illustrates a process of a receive-side of a network node for extracting control plane data from a Wi-Fi beacon. The process 1300 may be performed under the control of a management application and with modified driver of another network node, which controls operational parameters of that network node to extract control plane data Wi-Fi beacons. As used herein, to "extract" control plane data refers to obtaining at least on indication of control plane data but does not require removing control plane data from the Wi-Fi beacon. For example, control plane data embedded in a Wi-Fi beacon can be extracted by making a copy of that control plane data without changing the Wi-Fi beacon.

Similar to the transmit-side, the network node of the receive-side may run a management application that can instruct a modified driver application which, in turn, instructs firmware causing MAC hardware to select beacon frames for extraction of their embedded control plane data. Hence, a MAC layer parses and queues data in accordance with the modified operational parameters of the network nodes to, for example, extract control plane data from and/or modify beacon frames.

In step 1302, a MAC sub-layer readies Wi-Fi beacons that include control plane data for extraction by an information extraction module. A wireless beacon is consumed at the 802.11 layer. If one wants to send the information with respect to control and management, one needs this info to be extract and sent to higher layer. That is what is meant by a MAC sub-layers readies Wi-Fi beacons. The MAC sub-layer can identify Wi-Fi beacons that include control plane data in a variety of ways. For example, the MAC sub-layer can scan headers of Wi-Fi beacons for markers indicating that a Wi-Fi beacon has embedded control plane data. A Wi-Fi beacon with control plane data is then sent to the information extraction module, which performs an information extraction process 1304 to extract the embedded control plane data. In contrast, any Wi-Fi beacons that do not include control plane data can be passed directly to a PLCP sub-layer for transmission by a transmitter in step 1312.

In step 1306, an array data structure for a Wi-Fi beacon is used for extracting the control plane data. In step 1308, the information extracting module could require placing the particular array data structure in a Wi-Fi beacon and then extract the control plane data from the length field of the Wi-Fi beacon's IEs. For example, in step 1310, a copy of the embedded control plane data can be made without removing the control plane data from the Wi-Fi beacon so that the unmodified Wi-Fi beacon can propagate to another network node. Alternatively, the Wi-Fi beacon can be modified and then propagated to another network node. In step 1312, the beacon frame with the same or modified control plane data is passed to a PLCP sub-layer for transmission by the transmitter device.

Figure 14:
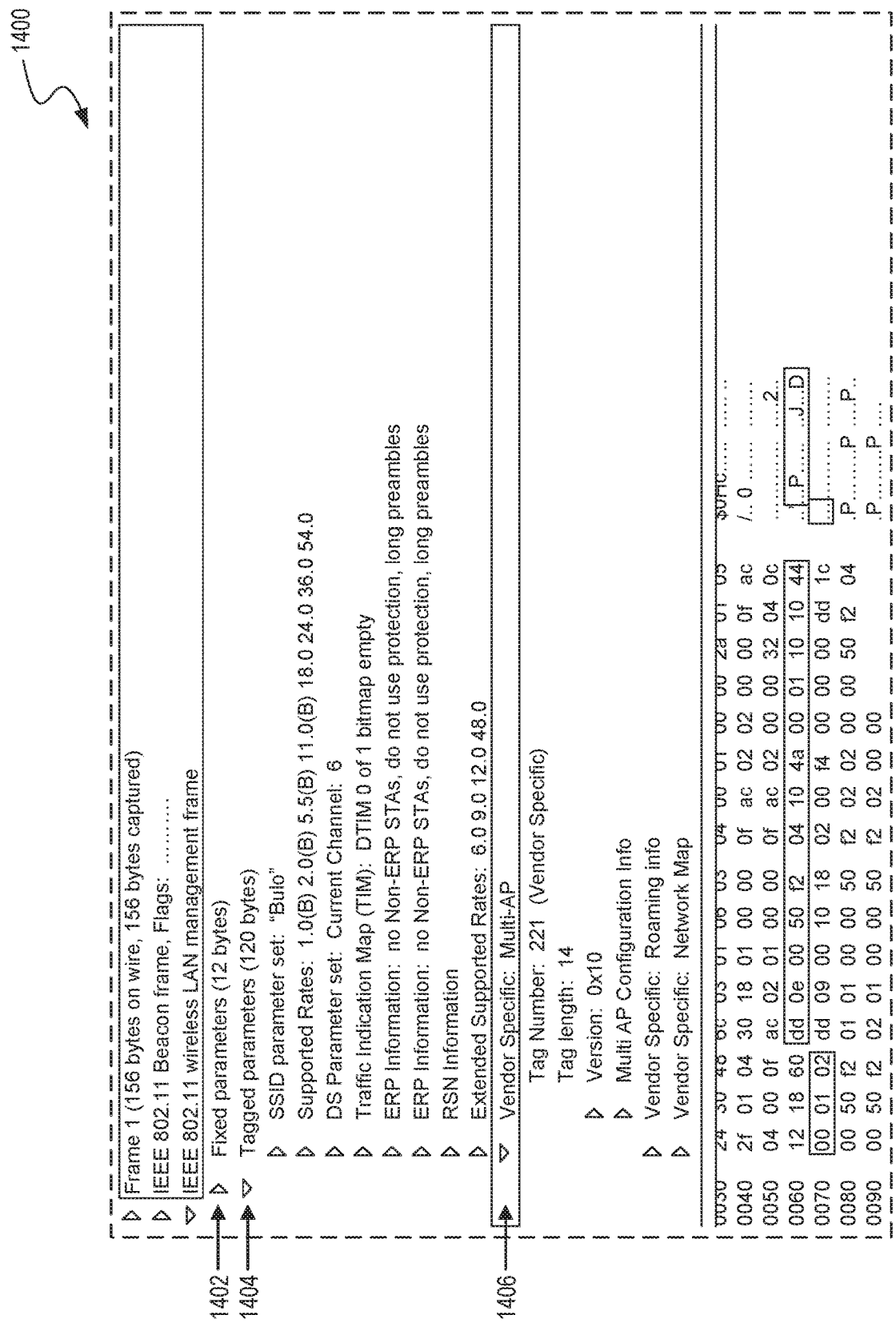
FIG. 14 illustrates a Wi-Fi beacon with a vender-specific information element used to facilitate management of a multi-band wireless networking system.

FIG. 14 illustrates a Wi-Fi beacon with a VIE including control plane data used to facilitate management of a multi-band wireless networking system. The Wi-Fi beacon 1400 has various parameters including, for example, fixed parameters 1402 and tagged parameters 1404. In addition, the Wi-Fi beacon 1400 includes VIE 1406 with multi-AP parameters for managing a multi-band networking system. In this example, the VIE parameters include a Tag Number, Tag length, Version, Multi AP Configuration Info, Vendor Specific Roaming info, and Network Map. One skilled in the art understands that these parameters are non-limiting examples but a VIE can include essentially any information to manage a system. In this instance, a network node could embed, extract, and/or modify information of the VIE to facilitate management of the system.

Although some embodiments disclosed herein are described in the context of repurposing existing beacon functionality to communicate control plane data, the disclosure is not so limited. For example, rather than modifying the functionality of standard beacon signals to embed control plane data that can be communicated to network nodes like standard beacon signals, some embodiments include the use of a completely new or dedicated beacon signal designed specifically to communicate control plane data in a multi-band networking system.

Embodiments of the dedicated beacon frames with control plane data can be part of control plane traffic that facilitates management of the system. For example, the dedicated beacon control frames can be handled by separate hardware and/or software from that which handles standard beacon frames. Moreover, the dedicated beacon control frames could be further prioritized over standard beacon frames. On the other hand, the dedicated beacon control frames could also employ known features such as request-to-send/clear-to-send (RTS/CTS) or clear-to-send self (CTS2SELF) mechanisms used in IEEE 802.11 to reduce frame collisions. For example, if a medium becomes unreliable or noisy, a dummy CTS/RTS can be communicated to avoid contention by quieting other devices so that a dedicated beacon control frame can be sent.

In some embodiments, beacon control frames may be sent at periodicities that are different from the periodicities of standard beacon frames or different among different beacon control frames to avoid collisions. That is, signaling of the beacon control frames may not overlap with standard beacon frames or beacon control frames of other network nodes. For example, some network nodes may implement a 100 ms transmission periodicity for standard beacon frames, while a network node may implement a 37 ms periodicity for beacon control frames because there is no multiple of 37 ms that would coincide with the 100 ms periodicity of the regular beacon frames. Thus, if two beacon frames overlap in one instance, they would not overlap in a next instance such that control plane data could be reliably communicated by network nodes.

To enable guaranteed delivery, transmission of the beacon control frames by network nodes can be anchored to a single time, similar to a real-time protocol. The transmission rate of network nodes can be synchronized to about 100 ms and delivery can be "guaranteed" by employing a best effort protocol. The term "guaranteed" refers to an improved delivery rate compared to beacon frames without control plane data. For example, guaranteed delivery can refer to a 90-100 percent delivery rate. As such, beacon control frames can rapidly and reliably reach destination nodes to achieve guaranteed delivery. Thus, the system can predict receipt of broadcasted control frames even when control packets have been missed by synchronizing the network nodes to the same time.

BLUETOOTH Frames Including Control Plane Data

Unlike Wi-Fi hardware, BLUETOOTH (BT) hardware is designed for short-range communications. Typically, BT hardware is used for device discovery and to pair devices so that a first device can, for example, stream media to a nearby second device. In this context, the BT hardware has a limited purpose. The disclosed embodiments, however, can re-purpose BT hardware to facilitate ongoing management of a multi-band networking system. In particular, a BT radio can be configured as a long-range radio that broadcasts BT period frames with control plane data to facilitate management of the system in a manner similar to Wi-Fi beacons as described elsewhere in this application. Hence, the description of using Wi-Fi beacons to manage the system could also apply to BT periodic frames.

For example, the transmit power of a BT radio can be increased to extend the transmission range. Existing BT transmit power ranges from 0-18 dBm (e.g., below the FCC limit of 30 dBm and the EU agency limit of 20 dBm). However, the transmit power does not need to be limited to this lower range for managing a multi-band networking system. Instead, BT radios can be coupled to external power amplifiers that increase the range that BT frames can be transmitted. Unlike other radio frequency (RF) communications protocols, BT uses a narrow band, lower order modulation to send data. Accordingly, the disclosed embodiments include BT frames with control plane data used to communicate control plane information in a multi-band networking system.

Figure 15:
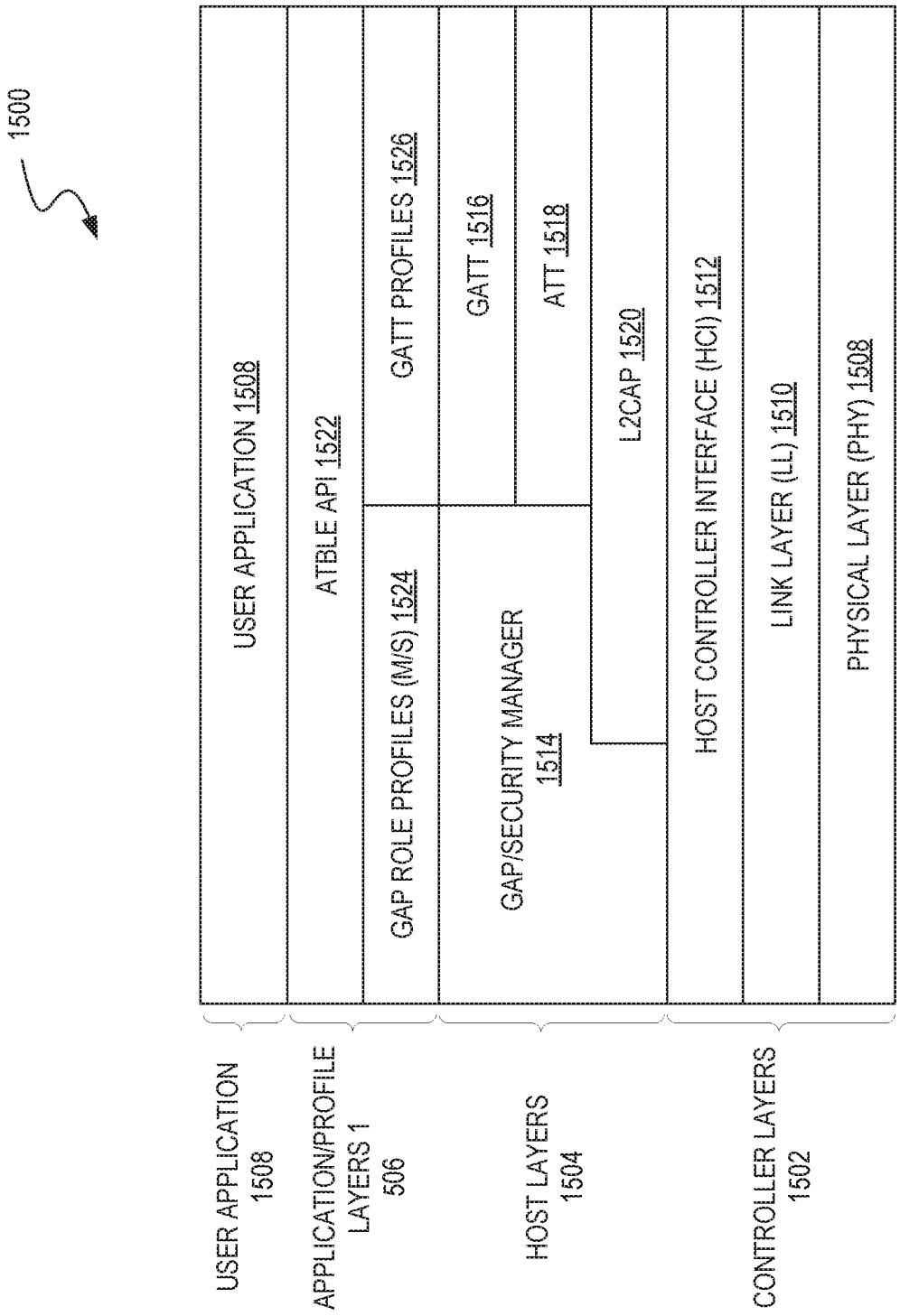
FIG. 15 illustrates a BLUETOOTH low energy (BLE) stack that can be used by a multi-band wireless networking system.

In some embodiments, BLE packets such as periodic packets can be used to transmit control plane data. FIG. 15 illustrates a BLE stack 1500, which is similar to a BR/EDR stack. The BLE stack 1500 include a controller layer 1502 at the bottom, followed by a host layer 1504, a profile layer 1506, and a user application layer 1508. The control layer 1502 of the BLE stack 1500 include a PHY layer 1508, a link layer 1510, and a host controller interface 1512. The host layers 1504 include a GAP/security manager 1514, GAT 1516, ATT 1518, and L2CAP 1520. In some embodiments, the network nodes can modify the L2CAP layer, similar to the description of the Wi-Fi beacon, and then send the control plane data in advertising channels. The application/profile layers 1506 include an ATBLE API 1522 that contains all the necessary commands to enable a user to readily develop a fully-featured BLE application. The user application 1508 can use the ATBLE API 1522 through the UART, using an external micro controller, or by writing a custom application to run on the GAP role profiles 1524 land GATT profiles 1526 layers.

Figure 16:
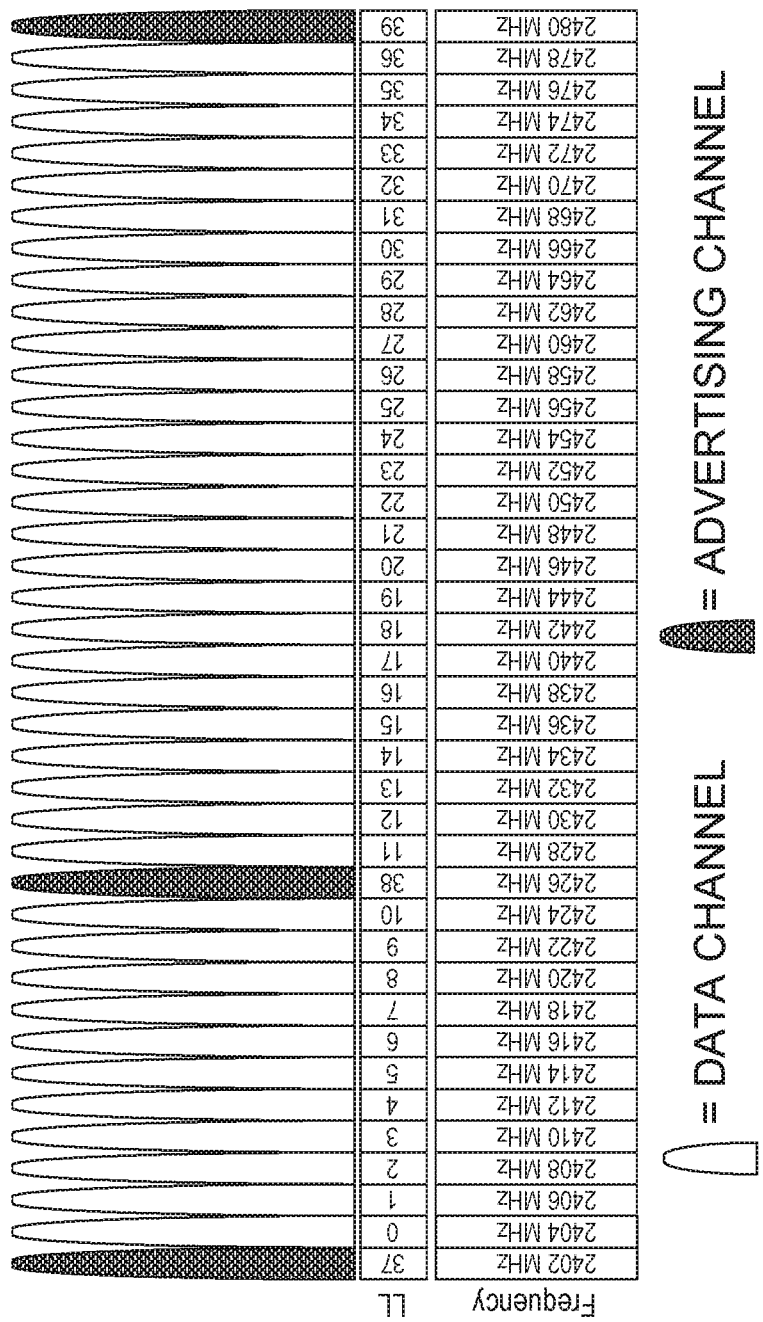
FIG. 16 illustrates a BLE channel plan for advertising a node in a multi-band wireless networking system.

BLE periodic packets include advertising channels and data channels that can be used to communicate control plane data. For example, FIG. 16 illustrates a BT channel plan with advertising channels for a multi-band wireless networking system. As shown, the BT signal has 40 channels including 3 advertising channels and 37 data channels. The advertising channels transmit periodically until a discovery phase has completed. The network nodes of the system can include different chipsets for advertising channels and data channels, and either type of channel can be used to communicate control plane data. As such, the same advertising mechanism of BT periodic packets can be adapted to communicate control plane data to manage a system. The BT periodic packets can be communicated at low rates (e.g., 2 MB/s), which are adequate for communicating control plane data in a robust manner. If a real-time protocol is taken in a time domain, the first few slots are typically frames used for time synchronization. Once time synchronization has been established, all subsequent packets may not be transmitted according to any pattern.

The disclosed embodiments can update management operation when the network topology changes. For example, a sequence-numbering process can be implemented by network nodes so that the most recent updates can be identified and implemented, which is a common problem in multi-band networking systems. For example, a time synchronization function (TSF) timer is a timer used for synchronization. The TSF timer of network node can be used to synchronize all network nodes to the TSF timer. Then the TSF timer could be used to timestamp control frames to indicate when such frames were created. In some embodiments, the system uses the NTP time, typically 1588, or any other equivalent methods.

In some embodiments, network nodes run a management application and perform a frequency hopping pattern. As such, frequency hopping could be used to communication control plane data, which would be more resilient to interference.

Figure 17:
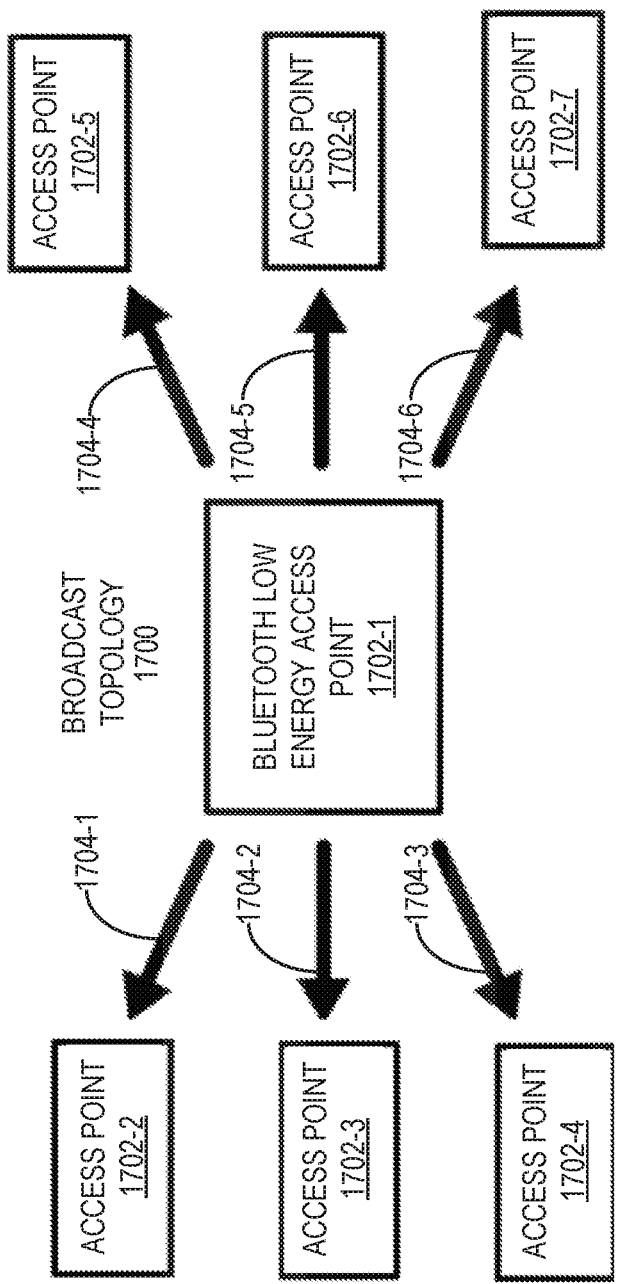
FIG. 17 is a block diagram illustrating use of BT broadcast signal for management of a multi-band wireless networking system.

In some embodiments, a BT-enabled AP device can broadcast control plane data, and then every other BT chipset of other BT-enabled AP device would know how to handle advertisements. As such, a network node can identify packets as management packets, extract control plane data, and then pass the packets to other network nodes. For example, FIG. 17 is a block diagram illustrating a BLE broadcast topology of a multi-band wireless networking system. As shown, the broadcast topology 1700 includes seven access point (AP) devices 1702-1 through 1702-7 that can broadcast BLE periodic packets to each other. In this particular example, the AP device 1702-1 is broadcasting copies of a periodic frame 1704-1 through 1704-6 to the AP devices 1702-2 through 1702-7. Each of the AP devices 1702-2 through 1702-7 then extracts the control plane data of the periodic packet that it receives, and updates its management information accordingly.

In some embodiments, AP devices receive a copy of the periodic frame do not acknowledge receipt of the periodic frame. Instead, the periodic frames are transmitted with sufficient frequency to ensure that other AP devices of the system are likely to receive the broadcasted periodic frame. In some embodiments, AP devices can acknowledge receipt of broadcasted periodic frames over another communications channel. For example, an AP device can acknowledge receipt of a broadcasted periodic frame over a dedicated backhaul channel or a data channel.

A BT packet that includes control plane data can be created in a manner similar to that described with respect to Wi-Fi beacons. For example, BT packets can be created by a management application and modified driver application. Then packets that are marked as a control frame cause the hardware of a network node to manipulate that control frame in accordance with the management application.

Figure 18:
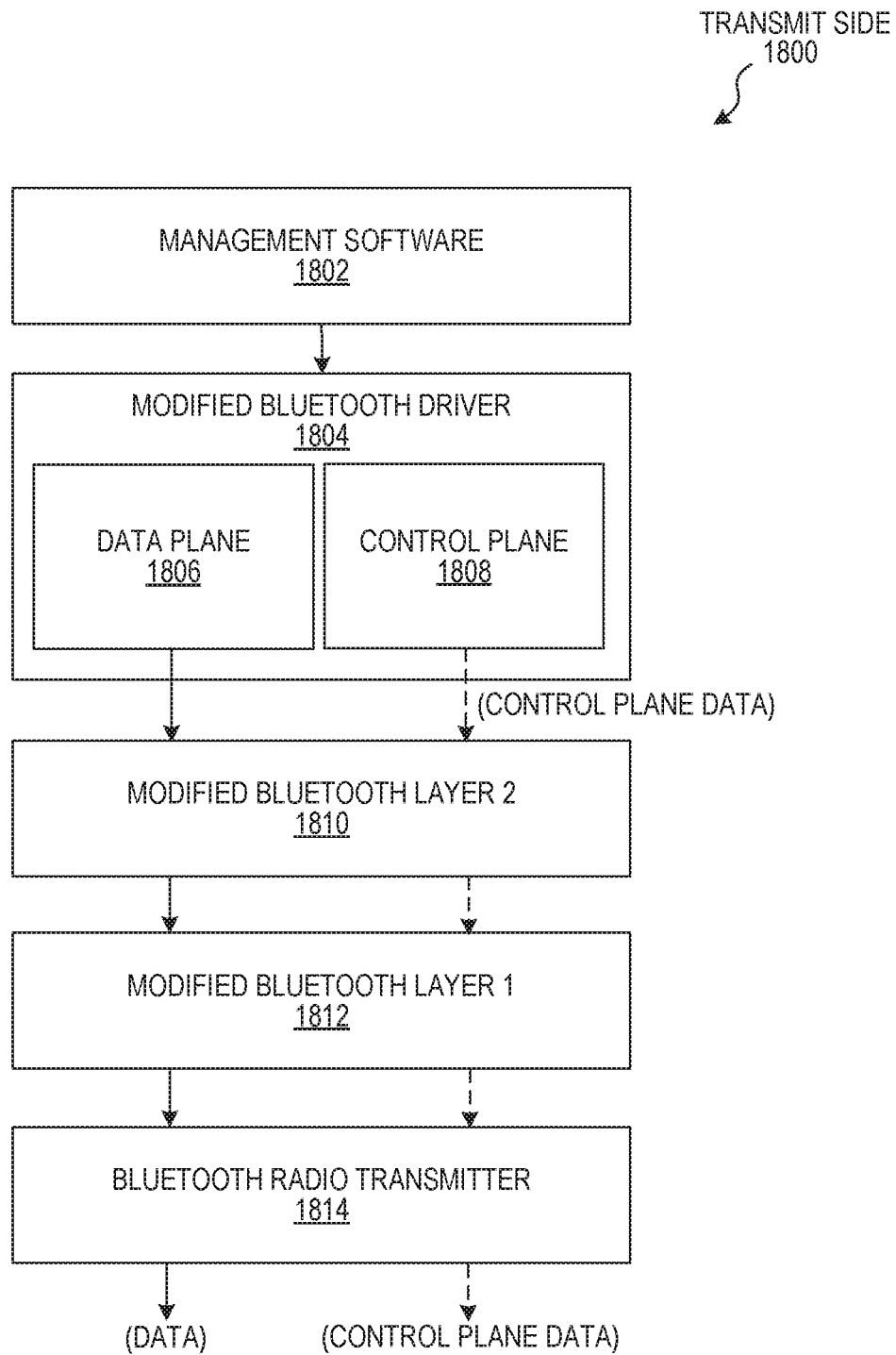
FIG. 18 is a block diagram illustrating addition of information to a BT beacon frame at a transmitter side of a multi-band wireless networking system.

FIG. 18 is a block diagram illustrating an operation of a transmit-side of a network node using BT frames to transmit control plane data for a multi-band wireless networking system. The data routed from a client node through the network node to the Internet includes fronthaul and backhaul traffic. The data communicated between network nodes includes control plane data required to maintain the system's operations. All this traffic can be processed and forwarded by a management software 1802, which transfers this traffic to a modified BT driver 1804.

The modified BT driver 1804 bifurcates traffic to either a data plane 1806 or control plane 1808. The data plane 1806 processes and routes any fronthaul/backhaul data. The control plane 1808 processes and routes any control plane traffic with higher priority. The control plane traffic is broadly defined as any traffic that originates at other network nodes and/or is generated for transmission to other network nodes. Examples of control plane traffic again include routing protocol traffic, system configuration traffic, or topology update traffic. For example, the management software 1802 can generate control signals in the form of control plane packets for transmission by the BT radio transmitter 1814 to another network node through the modified BT layer-2 1810 and the modified BT layer-1 1812. The generated control plane packets may include a marker that allows lower level components (e.g., PHY hardware) to recognize the packets as control plane packets and transmit according to the protocols established for the control plane.

In some embodiments, the data plane 1806 and control plane 1808 involve processes executed by a shared CPU (e.g., processor 112) using the shared resources of memory (e.g., memory 114). In some embodiments, the control plane can be implemented in firmware and/or as software. For example, a control plane 530 can be implemented in and managed by software which runs above a modified BT layer-2 1810 and/or a modified BT layer-1 of the OSI model. Both the data plane traffic and control plane traffic are received at and transmitted by the BT radio transmitter 1814.

To achieve robust transmission characteristics needed to effectively manage a multi-band wireless network, control plane traffic communicated between network nodes over the control plane is treated differently than backhaul communications carrying traffic to/from client devices. In particular, consider again the concept of embedding control plane data into BLE periodic frames communicated at lower rates but with more reliable delivery. Accordingly, the modified BT components provide a robust control plane that can generate, recognize, and treat control plane data according to protocols established for the BT control plane.

Figure 19:
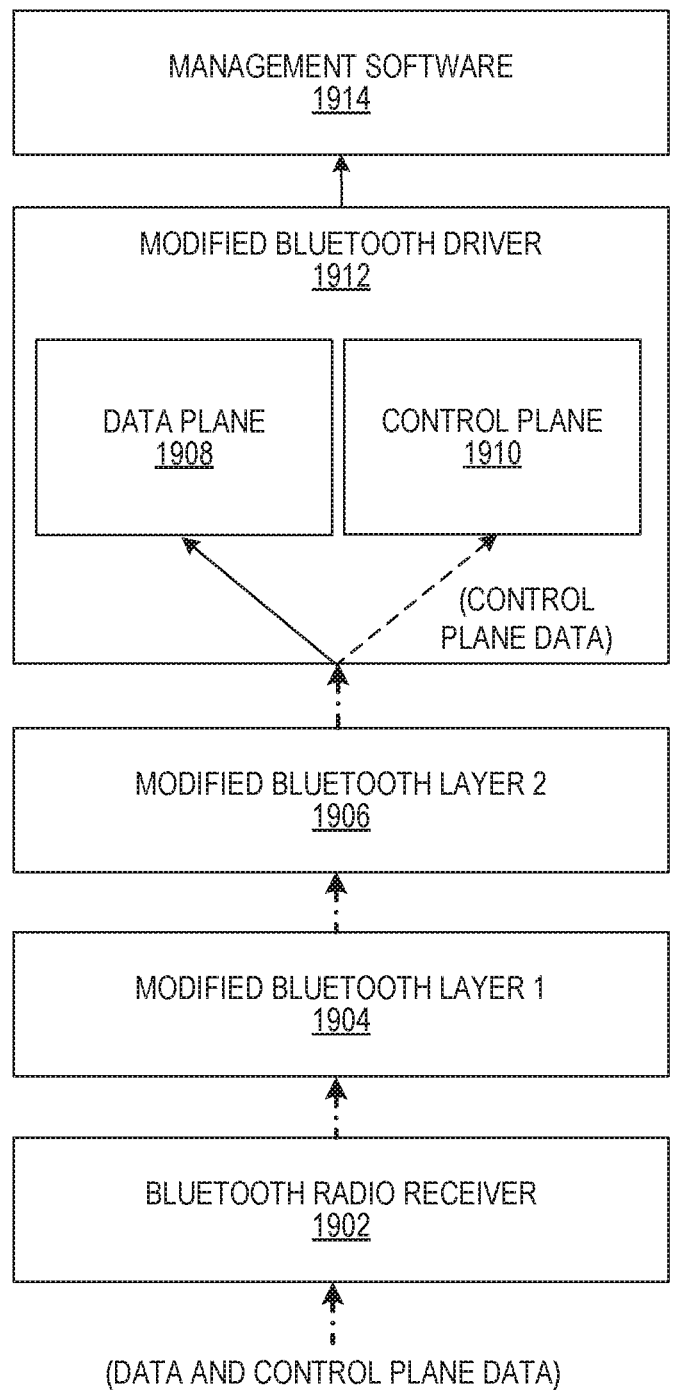
FIG. 19 is a block diagram illustrating extraction of information from a BT beacon frame at the receiver side of a multi-band wireless networking system.

FIG. 19 is a block diagram illustrating an operation of a receive side of a network node using BT periodic signal to transmit control plane data for a multi-band wireless networking system. A BT radio receiver 1902 can receive any combination of data (e.g., fronthaul/backhaul data or control plane traffic) over the system. The combination of data is sent to a modified BT driver 1912 through the modified BT layer-1 1904 and modified BT layer-2 1906. The modified BT driver 1804 processes and bifurcates all traffic to either a data plane 1806 or control plane 1808.

The data plane 1908 processes standard fronthaul/backhaul traffic that is routed from a client node through a network node to the Internet. The control plane 1910 extracts and processes control plane traffic with higher priority. Then, all this traffic can be processed by a management software 1802.

For example, any control plane packets of the combined data may include markers that allow the modified BT driver 1804 to recognize control plane packets and treat them according to the protocols established for the control plane 1910. Therefore, control plane traffic communicated between network nodes over the control plane is treated differently than other traffic communicated to/from client devices. Accordingly, the modified BT components provide a robust control plane that can generate, recognize, and treat control plane data according to protocols established for the BT control plane.

As previously discussed, protocols of the control plane may be configured for improved robust transfer of control plane data. In particular, data transmitted over the control plane can be transmitted at robust data rates, over multiple backhauls, using hybrid ARQ, or using dedicated radios configured for robust data transmission. For example, a hybrid ARQ procedure can be implemented for periodic frames. If the control packet does not reach a destination node, instead of re-sending the entire packet, the destination node can request the source node to send a particular portion of the packet that was corrupted (e.g., three bits). Hence, instead of requiring the source node to know the issue, it simply needs to re-send the requested data. However, implementing a hybrid ARQ could require a hardware modification in the chip.

Computer Implementation

FIG. 20 is a block diagram that illustrates a computing system in which at least some features of the disclosed technology can be implemented. The computing system 2000 (e.g., network node 100) may include one or more central processing units ("processors") 2002, main memory 2006, non-volatile memory 2010, network adapter 2012 (e.g., network interfaces), display 2018, input/output devices 2020, control device 2022 (e.g., keyboard, pointing device), drive unit 2024 including a storage medium 2026, and signal generation device 2030 that are communicatively connected to a bus 2016. The bus 2016 is illustrated as an abstraction that represents any one or more separate physical buses, point-to-point connections, or both connected by appropriate bridges, adapters, or controllers. Therefore, the bus 2016 can include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In some embodiments, the computing system 2000 may be a server computer, a client computer, a personal computer (PC), a user device, a tablet PC, a laptop computer, a personal digital assistant (PDA), a cellular telephone, an IPHONE, an IPAD, a BLACKBERRY, a processor, a telephone, a web appliance, a network router, switch or bridge, a console, a hand-held console, a gaming device, a music player, any portable, mobile, handheld device, or any machine capable of executing a set of instructions (sequential or otherwise) that specify actions to be taken by the computing system.

While the main memory 2006, non-volatile memory 2010, and storage medium 2026 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 2028. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 2004, 2008, 2028) set at various times in various memory and storage devices in a computer, and that, when read and executed by one or more processing units or processors 2002, cause the computing system 2000 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 2010, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 2012 enables the computing system 2000 to mediate data in a network 2014 with an entity that is external to the computing system 2000, such as a network appliance, through any known and/or convenient communications protocol supported by the computing system 2000 and the external entity. The network adapter 2012 can include one or more of a network adaptor card, a wireless network interface card, a router, an AP device, a wireless router, a switch, a multilayer switch, a protocol converter, a gateway, a bridge, bridge router, a hub, a digital media receiver, and/or a repeater.

The network adapter 2012 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    wirelessly interconnecting a plurality of network nodes to collectively form a multi-band wireless network configured to provide network access to a client node connected to any of the plurality of network nodes;
    establishing a control plane protocol that enables wireless communications of control plane data embedded in one or more periodic frames communicated by the plurality of network nodes; and
    managing the multi-band wireless network by wirelessly communicating the one or more periodic frames between the plurality of network nodes in accordance with the control plane protocol,
    wherein communicating one or more periodic frames comprises:
        obtaining, by a first network node of the plurality of network nodes, a first periodic frame including a marker indicative of particular control plane data;
        determining, by the first network node, that the first periodic frame includes the particular control plane data based on the marker; and
        causing, by the first network node, transmission of the first periodic frame in accordance with the control plane protocol.

2. The method of claim 1, wherein managing the multi-band wireless network comprises:
    generating the one or more periodic frames by modifying one or more standard periodic frames to embed the control plane data; and
    communicating the one or more periodic frames in a robust manner that improves a delivery rate compared to any standard periodic frames.

3. The method of claim 2, wherein the one or more standard periodic frames includes a Wi-Fi frame or a BLUETOOTH frame.

4. The method of claim 3, wherein the Wi-Fi frame or the BLUETOOTH frame includes the marker indicative of the particular control plane data.

5. The method of claim 1, wherein managing the multi-band wireless network comprises:
    creating the one or more periodic frames including the control plane data; and
    communicating the one or more periodic frames in a robust manner that improves a delivery rate compared to any standard periodic frames.

6. The method of claim 5, wherein the one or more periodic frames include Wi-Fi beacon frames or BLU- ETOOTH periodic frames, and each periodic frame includes the marker indicative of the particular control plane data.

7. The method of claim 1, wherein communicating the one or more periodic frames comprises:
broadcasting the one or more periodic frames to any of the plurality of network nodes in accordance with the control plane protocol.

8. The method of claim 1, wherein the marker is a first marker, the method further comprising:
obtaining, by the first network node, a second periodic frame that does not include a second marker indicative of control plane data;
determining, by the first network node, that the second periodic frame includes non-control plane data because the second periodic frame lacks the second marker; and
causing, by the first network node, transmission of the second periodic frame in accordance with a standard data plane protocol.

9. The method of claim 8, wherein any control plane data is prioritized for transmission over any standard data plane data.

10. The method of claim 1 wherein the marker is included in each periodic frame as any of:
a header appended to the periodic frame;
a modification of an existing header of the periodic frame; or
information in a frame body of the periodic frame.

11. The method of claim 10, wherein the existing header is a media access control (MAC) header.

12. The method of claim 1, wherein communicating the one or more periodic frames comprises:
transmitting the one or more periodic frames at a data rate set by the control plane protocol; and
dynamically modifying the data rate by to the control plane protocol to increase throughput.

13. The method of claim 1, wherein communicating the one or more periodic frames comprises:
transmitting a copy of the control plane data in a periodic frame to each of the plurality of network nodes.

14. The method of claim 1, wherein communicating the one or more periodic frames comprises:
receiving, by a first network node of the plurality of network nodes, a message from a second network, the message being transmitted in response to receiving one of the one or more periodic frames and communicated over a medium other than a periodic frame.

15. The method of claim 1, wherein communicating the one or more periodic frames comprises:
transmitting control plane data over a dedicated control channel in addition to the one or more periodic frames.

16. The method of claim 1, wherein each of the plurality of network nodes comprises:
a 2.4 GHz radio;
a 5 GHz low band radio; and
a 5 GHz high band radio.

17. The method of claim 1, wherein the plurality of network nodes comprises:
a router node configured to communicatively couple to an external network; and
a plurality of satellite nodes configured to communicatively couple to the router node and communicatively couple to the client node such that the client node has access to the external network via any of the plurality of satellite nodes.

18. A wireless networking device comprising:
a first radio configured for communication over a dedicated wireless communication channel with a plurality of other wireless networking devices that collectively form a multi-band wireless network configured to provide network access by a client device connected to any wireless networking device of the multi-band wireless network;
a second radio configured to provide network access by the client device connected to the wireless networking device of the multi-band wireless network;
a processor; and
a memory communicatively coupled to the processor, the memory including instructions stored thereon, which when executed by the processor cause the wireless networking device to:
communicate one or more periodic frames with any of the plurality of other wireless networking devices over a control plane for managing the multi-band wireless network,
wherein the control plane establishes a control plane protocol to wirelessly communicate control plane data embedded in the one or more periodic frames, and
wherein to communicate the one or more periodic frames comprises causing the wireless networking device to:
receive a periodic frame including a marker indicative of particular control plane data;
determine that the periodic frame has the particular control plane data based on the marker; and
transmit the periodic frame in accordance with the control plane protocol.

19. The wireless networking device of claim 18, wherein to communicate with the one or more periodic frames includes causing the wireless networking device to:
transmit the one or more periodic frames at a data rate set by the control plane protocol.

20. The wireless networking device of claim 19, wherein:
the first radio operates in the 5 GHz high band; and
the second radio operates in any of the 2.4 GHz band or 5 GHz low band.

21. The wireless networking device of claim 18 further comprising:
a third radio dedicated for communication of control plane data with the plurality of other wireless networking devices over the control plane.

22. The wireless networking device of claim 21, wherein the third radio operates at a lower frequency than the first radio or the second radio.

* * * * *